(12) United States Patent
Tanikawa et al.

(10) Patent No.: US 7,270,102 B2
(45) Date of Patent: Sep. 18, 2007

(54) RESIN INTAKE MANIFOLD

(75) Inventors: Hironori Tanikawa, Obu (JP); Kazuhiro Aiki, Obu (JP)

(73) Assignee: Aisan Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/266,194

(22) Filed: Nov. 4, 2005

(65) Prior Publication Data
US 2006/0048740 A1 Mar. 9, 2006

Related U.S. Application Data

(62) Division of application No. 10/811,985, filed on Mar. 30, 2004, now Pat. No. 6,988,478.

(30) Foreign Application Priority Data

| Apr. 9, 2003 | (JP) | ............................. 2003-105265 |
| Apr. 10, 2003 | (JP) | ............................. 2003-106570 |
| Apr. 11, 2003 | (JP) | ............................. 2003-108261 |

(51) Int. Cl.
F02N 17/00 (2006.01)
F02M 35/10 (2006.01)

(52) U.S. Cl. .............................. 123/184.42; 123/184.51

(58) Field of Classification Search ........... 123/184.42, 123/184.47, 187.53, 184.57, 184.51
See application file for complete search history.

(56) References Cited

U.S. PATENT DOCUMENTS

| 5,642,697 A | 7/1997 | Jahrens et al. |
| 6,021,753 A | 2/2000 | Chaffin et al. |
| 6,368,448 B1 * | 4/2002 | Okamura et al. ........ 156/274.2 |
| 6,446,591 B1 | 9/2002 | Chae et al. |
| 6,543,404 B2 * | 4/2003 | Jones et al. ............ 123/184.61 |
| 6,739,302 B2 * | 5/2004 | Jones et al. ............ 123/184.61 |
| 6,758,182 B2 * | 7/2004 | Nomizo et al. ........ 123/184.57 |
| 6,805,088 B2 | 10/2004 | Tachibana et al. |
| 6,857,409 B2 | 2/2005 | Ito et al. |
| 2002/0046725 A1 | 4/2002 | Ogata |

(Continued)

FOREIGN PATENT DOCUMENTS

JP 2002-364471 12/2002

*Primary Examiner*—John T. Kwon
(74) *Attorney, Agent, or Firm*—Rader, Fishman & Grauer PLLC

(57) ABSTRACT

A resin intake manifold is provided with two separated bodies manufactured by connecting protrusions of weld portions of the separated bodies to each other in accordance with a vibration welding, and a cover wall in which one of the weld portions is arranged in an inner side or an outer side of the protrusion with leaving space with the protrusion. The protrusions of the weld portions are respectively provided with parallel protrusion portions extending in parallel to a vibrating direction of the vibration welding, and a cover wall arranged at a position in an orthogonal direction to the vibrating direction in the parallel protrusion portions is provided with an extension portion extending to the separated body in the other side welded to the separated body provided with the cover wall, in such a manner as to prevent a burr generated at a time of welding the parallel protrusion portion from getting over the cover wall arranged at the position in the orthogonal to the vibrating direction in the parallel protrusion portion. A recess groove receiving the extension portion is arranged in a side of the other side separated body.

3 Claims, 34 Drawing Sheets

U.S. PATENT DOCUMENTS

| | | |
|---|---|---|
| 2002/0148427 A1 | 10/2002 | Jones et al. |
| 2003/0075135 A1* | 4/2003 | Kudo et al. ............ 123/184.42 |
| 2003/0084864 A1* | 5/2003 | Jones et al. ............ 123/184.61 |
| 2003/0140883 A1* | 7/2003 | Kemper et al. ........ 123/184.61 |
| 2003/0172894 A1 | 9/2003 | Iwata et al. |
| 2004/0194750 A1 | 10/2004 | Tanikawa et al. |
| 2004/0261745 A1 | 12/2004 | Kito et al. |
| 2006/0000437 A1* | 1/2006 | Kito et al. ............. 123/184.21 |

* cited by examiner

A.

B.

RESIN INTAKE MANIFOLD

CROSS REFERENCE TO RELATED APPLICATIONS

The present application is a Divisional Application of the patent application Ser. No. 10/811,985, filed Mar. 30, 2004, now U.S. Pat. No. 6,988,478, which is based on Priority Documents JP-2003-105265 filed on Apr. 9, 2003, JP-2003-106570 filed on Apr. 10, 2003 and JP-2003-108261 filed on Apr. 11, 2003, the entire contents of which are incorporated herein by reference.

BACKGROUND OF THE INVENTION

1. Field of the Invention

The present invention relates to a synthetic resin intake manifold used in an internal combustion engine for a motor vehicle, and more particularly to a resin intake manifold manufactured by connecting protrusions of weld portions of at least two separated bodies to each other in accordance with a vibration welding or the like.

2. Description of Related Art

Conventionally, a resin intake manifold is manufactured by vibration welding protrusions in welded portions of a plurality of separated bodies to each other, for example, as described in Japanese Unexamined Patent Publication No. 9-177624.

However, there is a case that set reference surfaces in the weld portions of the separated bodies are arranged in a curved shape or an inclined state, in accordance with a die cutting direction at a time of molding the separated bodies and a connecting direction between the separated bodies. Further, in some vibrating directions of the vibration welding, a burr (a weld burr) B is generated more than a predetermined amount at a time of welding protrusions 3 and 7 of weld portions 2 and 6 in separated bodies 1 and 5 to each other, as shown in FIG. 1A, and there is a case that the burr B protrudes over a cover wall 4 arranged in the periphery of the protrusions 3 and 7.

The burr B getting over the cover wall 4 is hard to be viewed if it appears in an inner side (an inner peripheral side) of the intake manifold. Accordingly, it takes a lot of trouble with checking out the burr. If the intake manifold is mounted to a vehicle in a state in which the burr B is left in the inner peripheral side, and is used, and the burr B is peeled away together with passing of an intake fluid, there is a risk that the burr flows to an engine side so as to be attached to a valve or the like, thereby generating an obstacle in a valve closing operation, so that this phenomenon is not preferable.

Further, if the burr B appears in an outer peripheral side of the intake manifold, an outer appearance design of the intake manifold is lowered, and this phenomenon is neither preferable.

Accordingly, it is necessary to check out presence of the burr B. Further, if the burr B is generated, it is necessary to carry out an extra finishing work such as a grinding work or the like for removing the burr B, thereby increasing a manufacturing man-hour and cost of the resin manifold. Therefore, it has been desired to easily prevent the burr generated at a time of vibration welding from being exposed to the inner peripheral side or the outer peripheral side of the product.

On the other hand, in the conventional resin intake manifold, it is desirable in view of a manufacturing man-hour and cost to integrally form a tank chamber such as a resonator or the like, in comparison with the case that the tank chamber is formed as an independent body.

However, in the case that the tank chamber has a large capacity, for example, it is necessary to form the tank chamber by adding the other pieces to two main pieces constituting the intake manifold, it is hard to secure a strength of each of the weld portions unless the weld portions of at least three pieces are properly arranged. In this case, it is reversely necessary to use a slide jig or the like so as to secure a proper welding strength, so that the manufacturing man-hour and cost are increased.

In accordance with the structure mentioned above, for example, as shown in FIG. 1B, there is exemplified a structure in which a first piece 101 and a second piece 105 are welded, an intake flow passage is formed at a position (not shown), the first piece 101 is provided with a tubular peripheral wall portion 104 forming a tank chamber 107 capable of structuring a resonator, and a third piece 106 is arranged as a cover member closing an end portion of the peripheral wall portion 104. In accordance with the structure mentioned above, in the first piece 101, a collar portion 102 for welding to the second piece 105, and a collar portion 103 for welding to the third piece 106 are arranged in both end portions of the tubular peripheral wall portion 104.

However, in the structure mentioned above, among pressurizing jigs 108 and 109 for pressurizing and supporting at a time of vibration welding the first piece 101 and the third piece 106, the pressurizing jigs 109 and 109 for supporting the collar portion 103 are structured such as to slide in an orthogonal direction to an axis of the peripheral wall portion 104 for preventing the pressurizing jigs 109 and 109 from being interfered with the collar portion 102, so that the structure of the pressurizing jigs 109 and 109 is complex, thereby increasing the welding cost. Further, since the pressurizing jig 109 supports in a cantilever state, it is hard to obtain a sufficient welding strength, it is necessary to make a welding time long to devise a countermeasure, and a lot of welding man-hour is required.

Further, since the conventional resin intake manifold is formed in accordance with a synthetic resin injection molding using a molding die at a time of manufacturing the resin intake manifold, the resin intake manifold is formed by being separated into a plurality of pieces, as described in Japanese Unexamined Patent Publication No. 8-252864. In particular, a portion running into an independent intake passage from a surge tank via a funnel portion is formed in a state of being separated as another piece. Further, in the case that the resin intake manifold is formed in a state of being separated into a plurality of pieces, the pieces are welded by weld lines corresponding to bonded portions in accordance with a vibration welding after being molded, whereby an entire resin intake manifold is manufactured.

However, in this kind of resin intake manifold, in the case that the weld line is formed so as to cross over in the portion running into the independent intake passage from the surge tank via the funnel portion, a step portion tends to be generated in the weld portion, and in the case that the step portion is formed so as to cross over a communication passage of the funnel portion perpendicularly, a turbulence is generated in an intake air flow in the portion, and a ventilation resistance of the intake air is increased.

Further, in the case that the separated pieces are welded in the weld line and the intake manifold is integrally formed, if the weld line is formed two-dimensionally or flat, the weld line is formed so as to be positioned within one flat surface, so that in the case that a vibration from the engine and a vibration pressure caused by an intake pulsation are applied at a time of being attached to the engine and used, a pressure resisting strength and a vibration resisting strength in the weld line tend to be lowered.

SUMMARY OF THE INVENTION

A first object of the present invention is to provide a resin intake manifold which can easily prevent a burr generated at a time of vibration welding from being exposed to an inner peripheral side and an outer peripheral side of a product.

The first object can be achieved by a resin intake manifold having the following structure. In other words, the resin intake manifold is provided with at least two separated bodies manufactured by connecting protrusions of weld portions of the separated bodes to each other in accordance with a vibration welding, and a cover wall in which one of the weld portions is arranged in an inner side or an outer side of the protrusion with leaving space with the protrusion, and structured such that the protrusions of the weld portions are respectively provided with parallel protrusion portions extending in parallel to a vibrating direction of the vibration welding, a cover wall arranged at a position in an orthogonal direction to the vibrating direction in the parallel protrusion portions is provided with an extension portion extending to the separated body in the other side welded to the separated body provided with the cover wall, in such a manner as to prevent a burr generated at a time of welding the parallel protrusion portion from getting over the cover wall arranged at the position in the orthogonal to the vibrating direction in the parallel protrusion portion, and a recess groove receiving the extension portion is arranged in a side of the other side separated body.

In the resin intake manifold in accordance with the present invention, a lot of burrs are generated in the portion of the parallel protrusion portion at a time of vibration welding the protrusions in the weld portions of the corresponding separated bodies to each other. However, even when the burr is going to extend in an approximately orthogonal direction from the parallel protrusion portion so as to get over the cover wall during a welding step, the extension portion extending to the other side separation body welded to the separation body provided with the cover wall is formed in the cover wall, and the extension portion stops the burr and prevents the burr from being exposed to the inner side or the outer side of the intake manifold.

Further, since the extension portion is arranged in the recess groove of the other side separation body after the welding is finished, and can keep the burr in the space in the side of the parallel protrusion portion of the extension portion, it is possible to prevent the burr from being scattered even in the case that the burr is arranged in the inner side of the intake manifold.

Accordingly, in the resin intake manifold in accordance with the present invention, it is possible to easily prevent the burr generated at a time of vibration welding from being exposed to the inner peripheral side or the outer peripheral side of the product, only by arranging the extension portion, and it is possible to prevent the burr from being scattered. Accordingly, it is possible to reduce the manufacturing man-hour and cost, at such a degree that the inspection of presence of the burr and the removing process can be simplified. Of course, even in the case that the set reference surfaces of the weld portions in the separated bodies are formed in a curved shape or in an inclined state, the burr is not exposed to the inner peripheral side or the outer peripheral side of the product. Accordingly, it is possible to freely set the die cutting direction at a time of molding the separated body itself and the connecting direction between the separated bodies without constraints caused by the burrs, and it is possible to improve a design freedom of the separated bodies.

Further, the structure may be particularly made such that the resin intake manifold is provided with a plurality of distribution passages capable of flowing an intake fluid so as to integrally put base portion sides together and separate leading end portion sides into a plurality of sections, two separated bodies are constituted by a cover member forming an outer wall of each of the distribution passages, and a base member welded to the cover member and forming each of the distribution passages together with the cover member, and the cover member is provided with an assembled portion integrally covering the base portion sides of the respective distribution passages, and branch portions arranged so as to extend from the assembled portion to the leading end portion sides of the respective distribution passages and separated from each other in correspondence to the number of the respective distribution passages. In this case, it is desirable that the vibrating direction at a time of vibration welding is set to a direction extending along the parallel arranging direction of the respective distribution passages, and the parallel protrusion portion and the cover wall provided with the extension portion are arranged at a leading end of each of the branch portions in the cover member.

In other words, the cover member is welded to the weld portion of the other side base member in a state in which an entire area of the weld portion including the assembled portion and the respective branch portions are pressurized and supported by the pressurizing jig used for the vibration welding at a time of vibration welding. However, the leading end sides of the respective branch portions are separated with each other and tend to be dispersed in a dimensional accuracy, in comparison with the assembled portion, so that a dispersion is generated in a weld margin at a time of welding. Accordingly, in addition to the parallel protrusion portion in which the burr tends to be generated, the portion generating the burr tends to be further generated. However, since the cover wall provided with the extension portion is arranged in the portion in which the burr tends to be generated, it is possible to accurately cover the burr. Of course, the vibrating direction at a time of welding is set to the direction extending along the parallel arranging direction of the respective distribution passages in place of the direction extending along the respective distribution passage. Accordingly, even in the case that the respective distribution passages are arranged spirally in the outer peripheral side of the intake manifold from an upstream side of the intake fluid to a downstream side, it is possible to weld the cover member to the base member by smoothly vibrating the cover member.

Further, the structure may be made such that the cover wall provided with the extension portion is arranged in the side of each of the distribution passages in the parallel protrusion portion. In accordance with the structure, there is no risk that the burr is scattered within the distribution passage, and it is possible to prevent an engine trouble caused by the burr.

A second object of the present invention is to provide a resin intake manifold which can be manufactured while restricting an increase of a manufacturing man-hour and cost, even in the case that a tank chamber formed over three welded pieces is integrally provide.

The second object can be achieved by the resin intake manifold having the following structure. In accordance with the present invention, there is provided a resin intake manifold manufactured by welding at least three separated first, second and third pieces while pressurizing, and provided with a tank chamber communicated with a part of a flow passage of an intake fluid and formed by the first, second and third pieces, wherein the first and second pieces are structured such as to be welded to each other for forming the flow passage of the intake fluid, the first piece is provided with a tubular peripheral wall portion commonly using a wall portion forming the intake flow passage and constituting the tank chamber, the second piece is provided with a ceiling wall portion covering one end portion side of the peripheral wall portion, the third piece is structured as a cover member closing another end portion side of the peripheral wall portion, an outer weld collar portion for welded to the second piece is arranged in an outer peripheral edge of the first piece including the peripheral wall portion so as to be formed to protrude to an outer side, and a portion weld to the third piece in the first piece is provided with an inner weld collar portion protruding to the inner peripheral wall surface of the peripheral wall portion in such a manner as to prevent an interference with a pressurizing jig supporting the outer weld collar portion at a time of welding the first piece and the second piece.

In other words, in the resin intake manifold in accordance with the present invention, even in the case that one end portion of the peripheral wall portion in the first piece is provided with the outer weld collar portion for welding to the second piece, the weld portion to the third piece in another end portion of the peripheral wall portion is formed as the inner weld collar portion which can prevent the interference with the pressurizing jig supporting the outer weld collar portion at a time of welding the first piece to the second piece.

Further, at a time of welding the first piece and the third piece, the inner weld collar portion of the peripheral wall portion can be supported by the pressurizing jig arranged in the inner peripheral side of the peripheral wall portion, and the pressurizing jig can be formed by a simple structure which is not necessary to be slid. Accordingly, since a welding cost is not increased and the inner weld collar portion can be firmly supported in the inner peripheral side of the peripheral wall portion, it is not necessary to make a weld time too long and a welding man-hour is not increased.

Of course, since the first piece can be welded to the second piece by utilizing the outer weld collar portion which is easily supported, a sufficient strength can be easily secured in welding the first and second pieces to each other.

Accordingly, in the resin intake manifold in accordance with the present invention, even in the case that the tank chamber formed over three welded pieces is integrally provided, the weld cost and man-hour are hardly increased. Therefore, it is possible to manufacture the resin intake manifold while restricting the increase of the manufacturing man-hour and cost.

Even in the case that the inner weld collar portion is structured so as to protrude to the inner portion of the peripheral wall portion, since the inner weld collar portion is provided in the tank chamber forming no flow passage of the intake fluid, there is no risk that no influence is applied to the flow of the intake fluid.

Further, the structure may be made such that the peripheral wall portion of the first piece is formed in a forward tapered shape from the outer weld collar portion to the inner weld collar portion along an axial direction. In accordance with this structure, an end portion of the peripheral wall portion in the side of the inner weld collar portion can make an outer shape small, and it is possible to further prevent the interference with the pressurizing jig supporting the outer weld collar portion at a time of welding the first piece to the second piece, so that it is possible to stabilize the support of the outer weld collar portion of the first piece, and it is possible to improve a weld strength between the first and second pieces.

Even in the case that the peripheral wall portion is formed in the forward tapered shape from the outer weld collar portion to the inner weld collar portion along the axial direction, the capacity of the peripheral wall portion can be secured as large as possible. In other words, in the end portion of the forward tapered peripheral wall portion, since the inner weld collar portion is provided in an inner peripheral side, the outer peripheral side portion of the peripheral wall portion at the position can be arranged at an outer position as close to the position extending along the axial direction of the peripheral wall portion in the outer weld collar portion as possible, within a range in which the taper shape can be maintained. Therefore, it is possible to arrange the end portion of the peripheral wall portion in the side of the inner weld collar portion as close to an outer side in a radial direction of the peripheral wall portion as possible, and it is possible to secure the capacity of the peripheral wall portion large.

Further, in the case that the intake flow passage formed by the first piece forms a part of the surge tank, it is desirable that the tank chamber is arranged in a space between the surge tank and a discharge port of the intake flow passage. In accordance with the structure mentioned above, it is possible to arrange the tank chamber in a dead space between the surge tank and the discharge port of the intake flow passage, and it is possible to structure the intake manifold provided with the tank chamber compact. Further, even in the case that the tank chamber is provided in the dead space mentioned above, not only the welding between the first and third pieces in the peripheral portion of the tank chamber, but also the welding between the first and second pieces can be executed while stably supporting the weld portions by a predetermined pressurizing jig, so that it is possible to sufficiently secure the strength and it is possible to easily carry out the welding operation.

In this case, the welding operation in accordance with the present invention is constituted by a vibration welding of welding while pressurizing by utilizing a friction heat caused by the vibration including a supersonic welding or the like, and is carried out by using the pressurizing jig supporting the pieces so as to vibrate the pieces while pressurizing.

A third object of the present invention is to provide a resin intake manifold which can improve a pressure resisting strength and a vibration resisting strength, and can restrict a ventilation resistance of the intake air caused by the weld line.

The third object can be achieved by a resin intake manifold having the following structure. In accordance with the present invention, there is provided a resin intake manifold having a plurality of pieces formed in a predetermined shape and welded along a weld line, a surge tank and an independent intake passage connected to the surge tank, wherein a funnel portion is formed in a portion connected from the surge tank to the independent intake passage, the weld line is formed so as to cross over a portion near the funnel portion, a funnel partition wall separating a plurality of independent intake passages is formed in the funnel portion so as to protrude from one piece to another piece, a funnel wall receiving portion receiving the funnel partition wall is formed in another piece, and the funnel partition wall and the funnel wall receiving portion are welded in bonded surfaces.

In this case, it is preferable that the funnel partition wall of the funnel portion is formed in an approximately triangular shape such that a corner portion protrudes to another piece side. It is preferable that an approximately V-shaped folded weld line is formed in an edge portion of the funnel partition wall in the funnel portion.

The resin intake manifold having the structure mentioned above is manufactured in such a manner that a plurality of pieces are formed in a predetermined shape by a synthetic resin, and the pieces are welded along the weld line in accordance with the vibration welding or the like. The surge tank and a plurality of independent intake passage connected thereto are formed in the inner portion of the resin intake manifold, the funnel portion is formed in the portion connected from the surge tank to the independent intake passage, the funnel partition wall is formed in the funnel portion so as to protrude from one piece to another piece, and the weld line is formed and welded in the bonded surface of the funnel partition wall.

Accordingly, the weld line formed so as to cross over the funnel portion is not formed as a flat line on a flat surface, but is formed as a three-dimensional shape. Therefore, in the case that the intake manifold is attached to the engine and used, and the vibration caused by the vibration of the engine and the pulsation of the intake air are applied to the funnel portion, it is possible to effectively inhibit a deformation in a three-dimensional direction of the portion, and it is possible to improve a pressure resisting strength and a vibration resisting strength of the portion and an entire manifold. Further, since the step which tends to be generated in the inner wall of the intake passage within the funnel portion by the weld line is formed in a direction approximately extending along the ventilation direction which is different from the transversal direction of the intake passage, it is possible to reduce the ventilation resistance of the intake air.

Further, the structure may be made such that the funnel partition wall of the funnel portion is formed in an approximately triangular shape such that the corner portion protrudes to another piece side, or an approximately V-shaped folded weld line is formed in an edge portion of the funnel partition wall in the funnel portion. In accordance with this structure, it is possible to further improve the pressure resisting strength and the vibration resisting strength, and it is possible to reduce the ventilation resistance of the intake air.

DESCRIPTION OF THE PREFERRED EMBODIMENTS

Figure 1A:
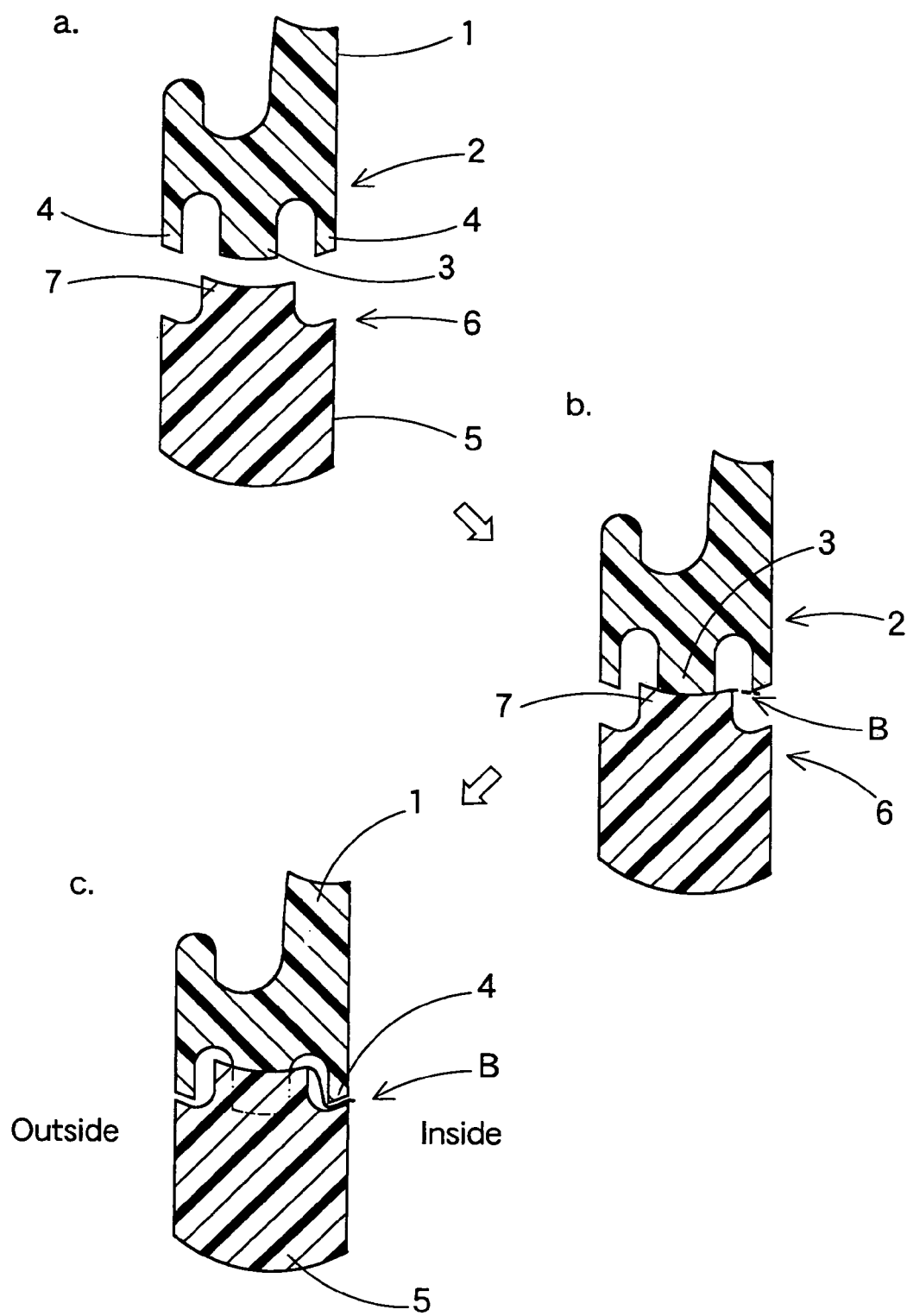
FIG. 1A is a view explaining a conventional vibration welding time.
Figure 1B:
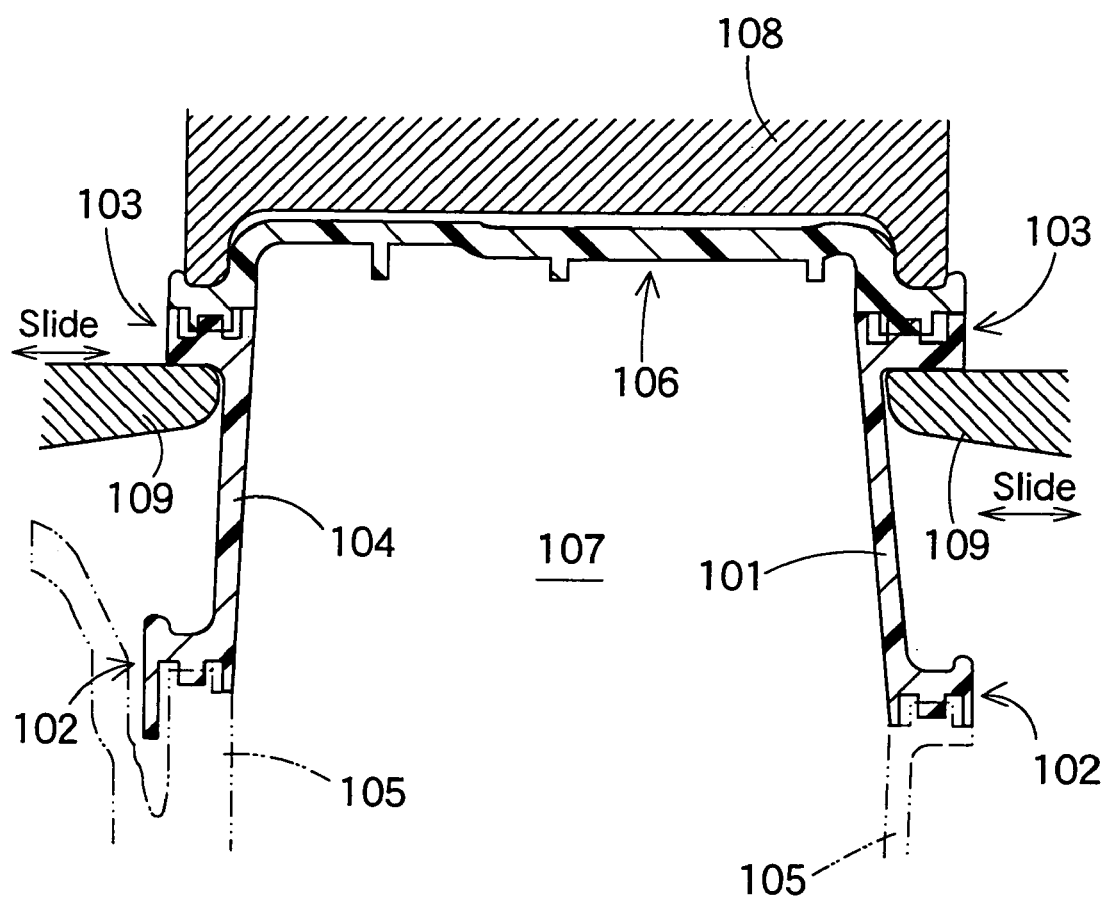
FIG. 1B is a view describing a welding process to which a conventional embodiment is applied.
Figure 2:
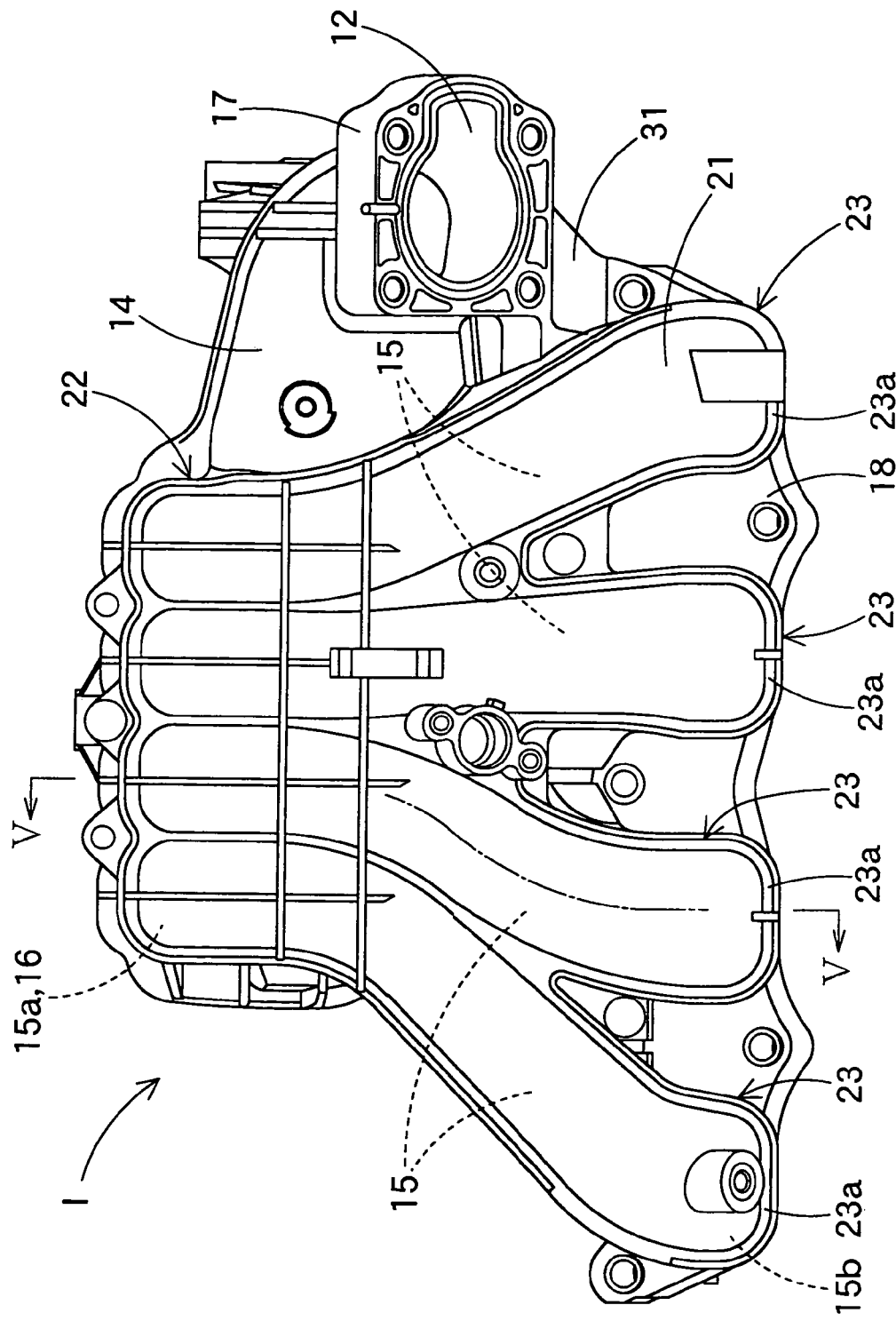
FIG. 2 is a plan view of a resin intake manifold in accordance with a first embodiment of the present invention.
Figure 3:
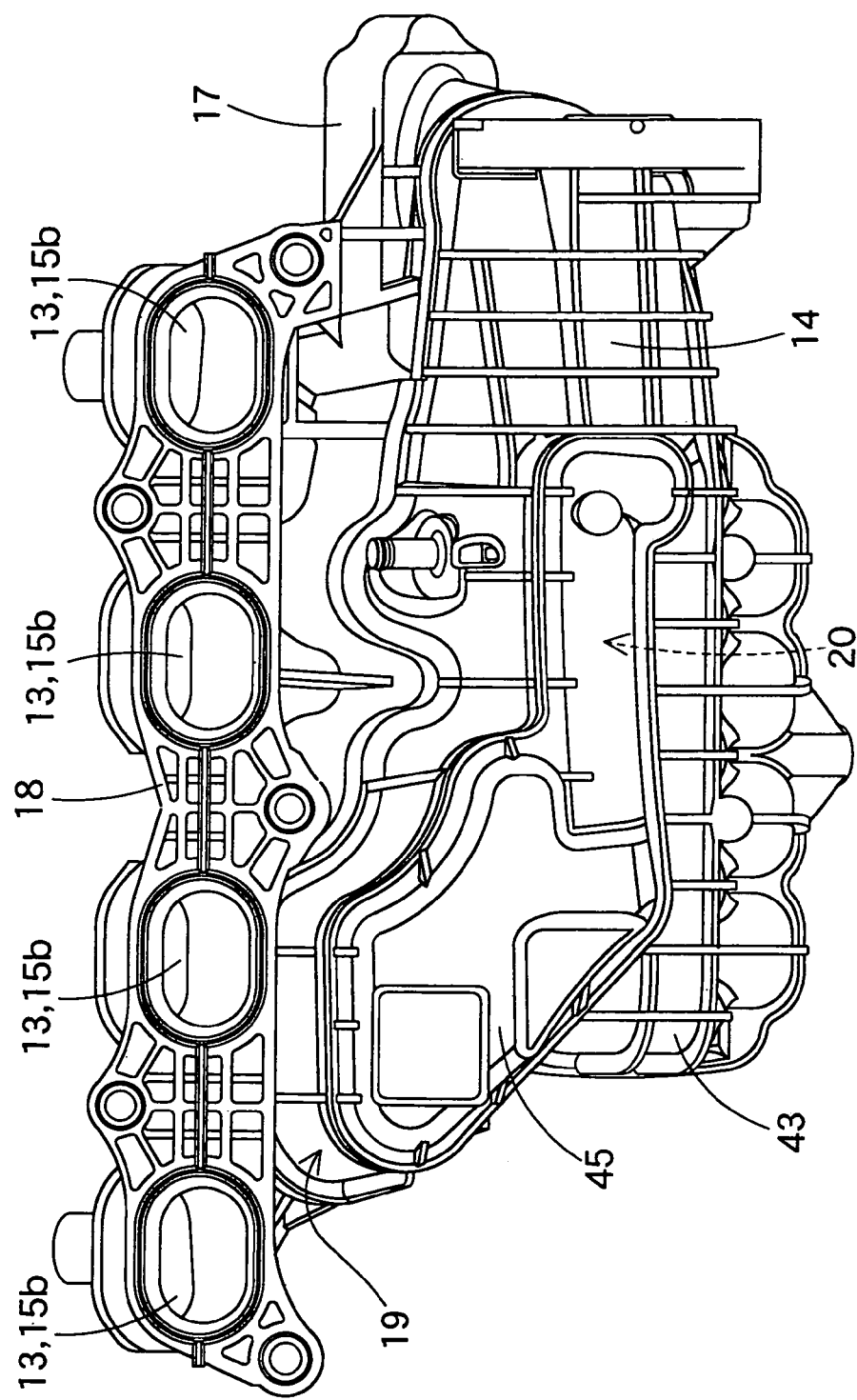
FIG. 3 is a bottom elevational view of the intake manifold.
Figure 4:
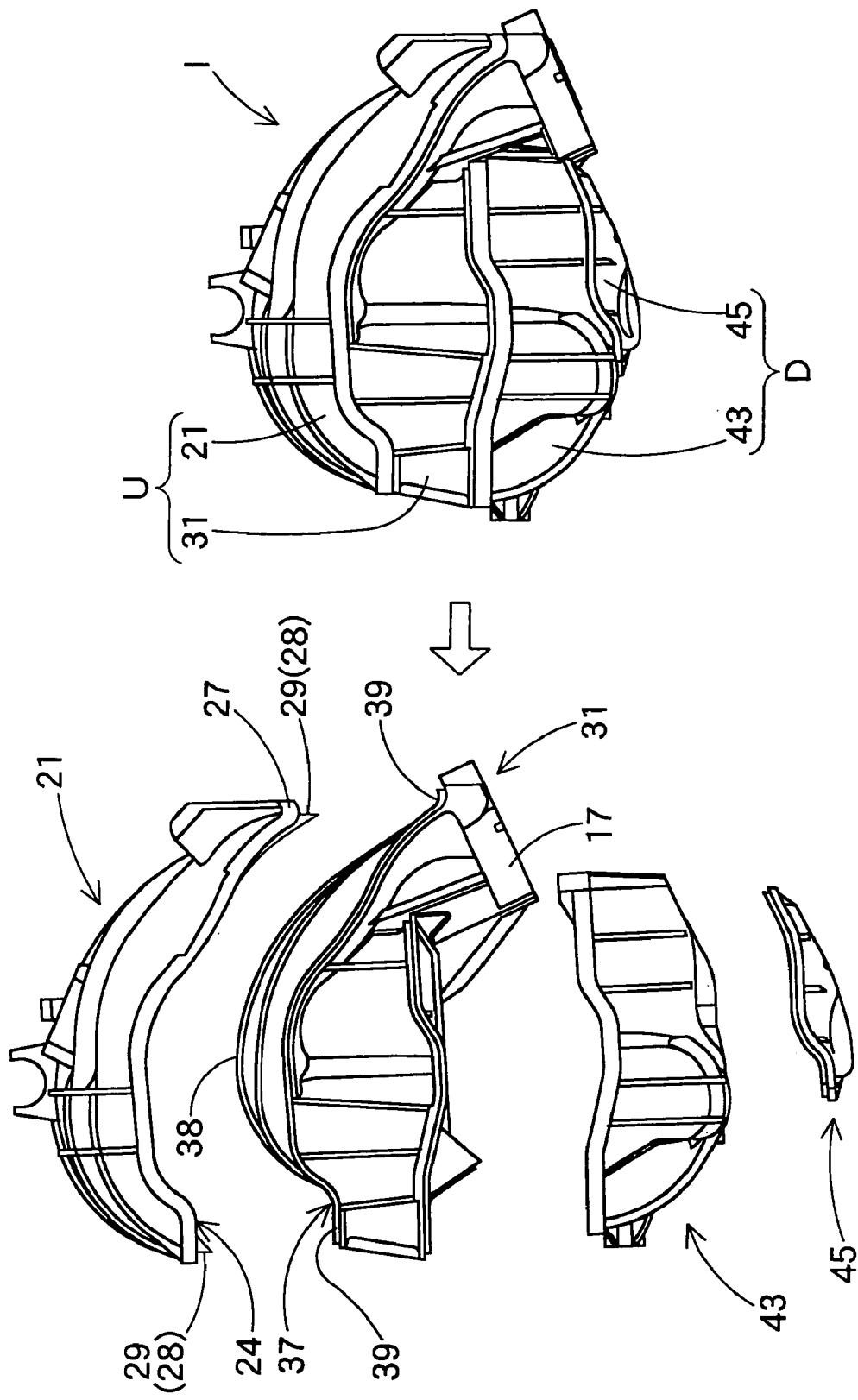
FIG. 4 is a view showing a left side elevational view of the intake manifold and an exploded state thereof.

A description will be given below of the present invention on the basis of an embodiment shown in the accompanying drawings. In this case, the description is not limited to the embodiment. All modifications within the contents of claims or equivalents relating to the contents are included within the scope of claims.

FIGS. 2 to 11 show a resin intake manifold in accordance with a first embodiment. A resin intake manifold I is constituted by four separated bodies which are respectively formed by a thermoplastic synthetic resin such as 6 nylon with filler or the like and comprise a cover member 21, a base member 31 positioned below the cover member 21, a tank and resonator combined member 43 positioned below the base member 31, and a resonator bottom member 45, as shown in FIGS. 2 to 5. Further, the intake manifold I in accordance with the embodiment is assembled between a throttle body (not shown) and a cylinder head side of an engine, and is structured such that a flow passage 11 of an intake fluid F (refer to FIG. 5), and a resonator 19 communicated with a part of the intake flow passage 11 are provided.

The intake flow passage 11 is structured such as to be provided with a surge tank 14 positioned in an upstream side, and distribution passages 15 for distributing an intake fluid F from the surge tank 14 to respective cylinders of the engine. The distribution passages 15 are integrally assembled in a lower portion in a side of a base portion 15a corresponding to a back surface side of the intake manifold I, and are structured such that a side of a leading end corresponding to a front surface side of the intake manifold I is separated into a plurality of leading end portions 15b so as to freely flow the intake fluid F therethrough. In the case of the embodiment, four distribution passages are arranged in parallel in a lateral direction.

In this case, the fluid F passing through the throttle valve is flowed into the intake flow passage 11 from an intake port 12 (refer to FIG. 7), and is discharged from four discharge ports 13 so as to pass through the surge tank 14 of the intake flow passage 11 and the distribution passages 15 and flow into the engine side. The intake port 12 is arranged in a right end side of the intake manifold I so as to be open to a diagonally upper side, and a flange portion 17 connected to a side of a throttle body (not shown) is formed in the periphery of the intake port 12. Each of the discharge ports 13 is arranged so as to be open to a downward direction in a front surface side of the intake manifold I, and a flange portion 18 connected to a side of an engine (not shown) is formed in the periphery of each of the discharge ports 13.

Figure 5:
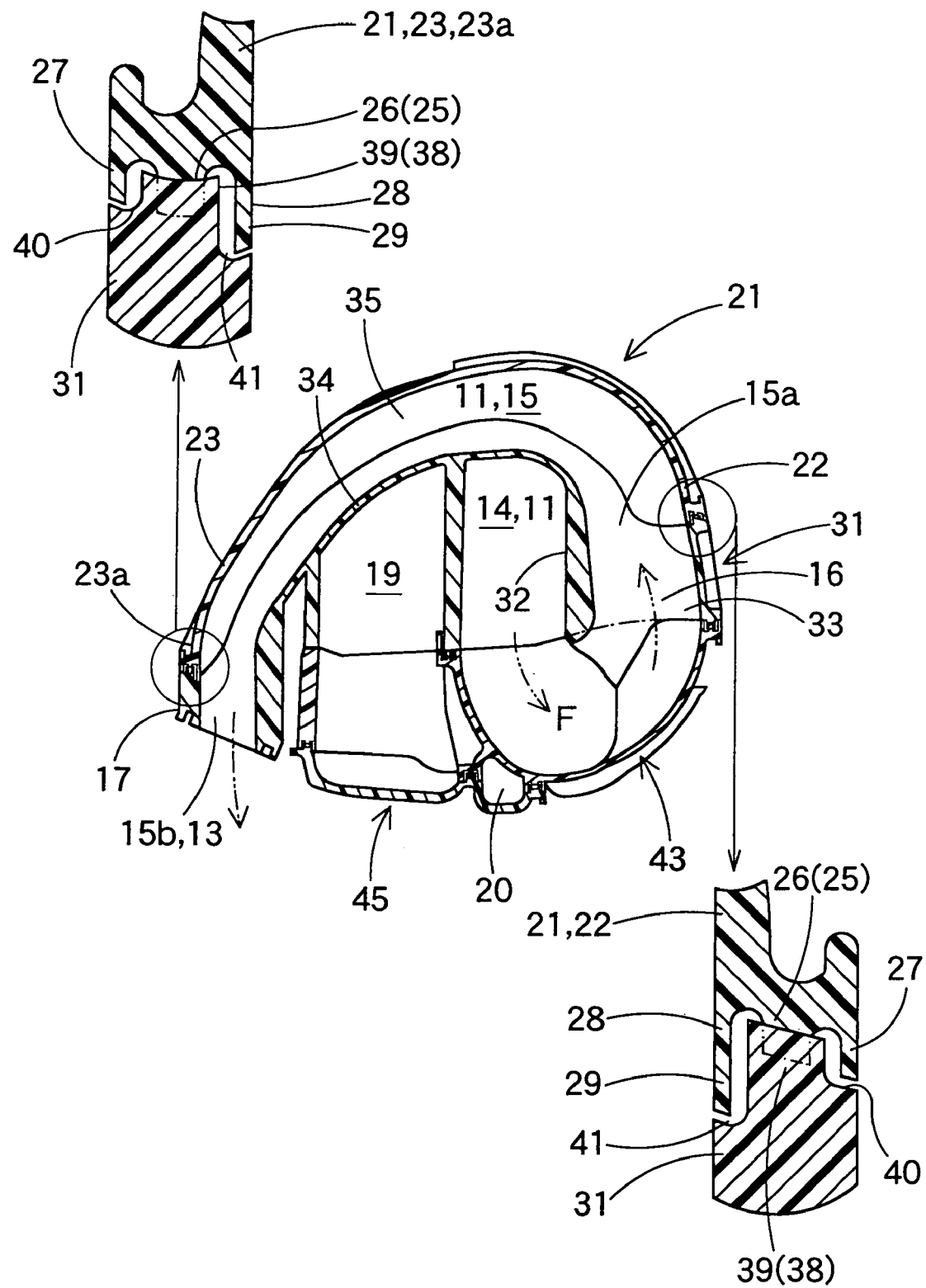
FIG. 5 is a vertical cross sectional view of the intake manifold and corresponds to a portion along a line V-V in FIG. 2.
Figure 6:
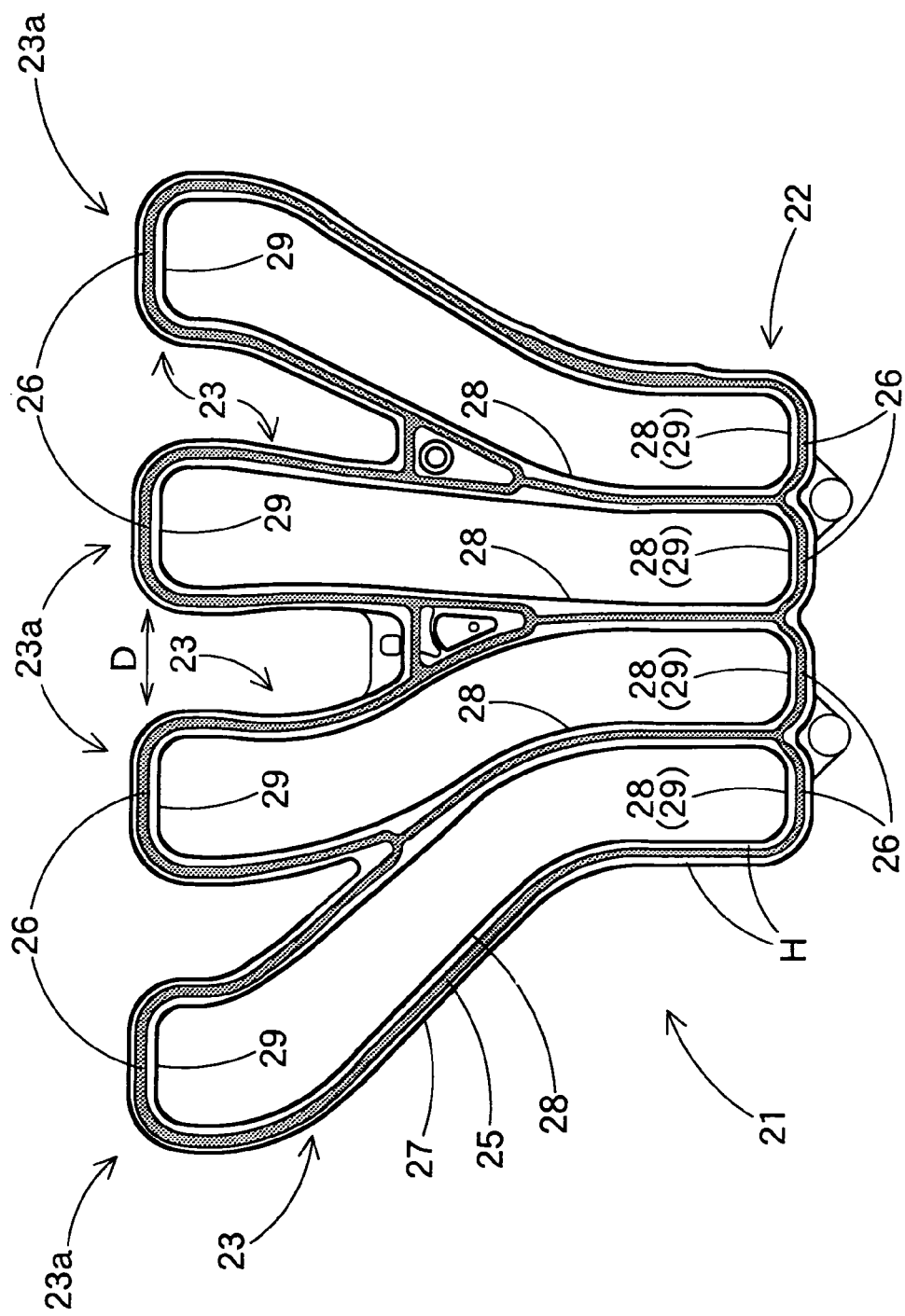
FIG. 6 is a bottom elevational view of a cover member of the intake manifold.
Figure 7:
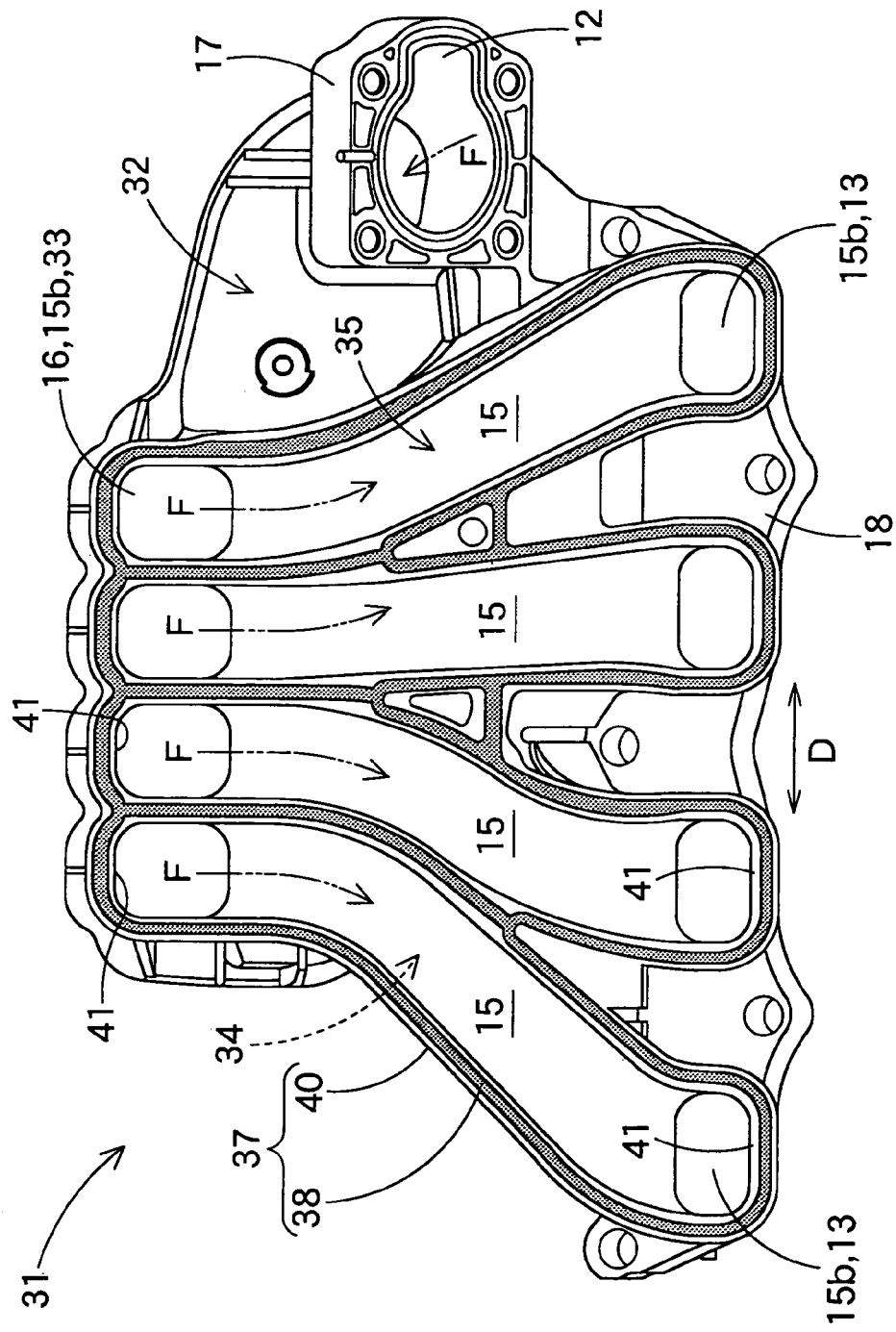
FIG. 7 is a plan view of a base member of the intake manifold.

The surge tank 14 is arranged such as to extend approximately in a cylindrical shape from the intake port 12 to a left side by setting the side of the intake port 12 to a right end side. Four distribution ports 16 (refer to FIGS. 5 and 7) communicating with the respective distribution passages 15 are arranged in parallel in a back surface side of the intake manifold I in the surge tank 14, in the side of the base portions 15a of the respective passages 15. Each of the distribution passages 15 is arranged so as to extend from a back surface side of the intake manifold I toward an upper surface side, and extend from the upper surface side to a lower (the leading end portion 15b) side in a front surface side. In other words, the fluid F flowing from the intake port 12 flows to a left side from a right end side of the surge tank 14, flows into each of the distribution passages 15 from each of the distribution ports 16 toward the upper side, flows from a back surface side of the intake manifold I to an upper surface side so as to flow spirally in each of the distribution passages 15, and flows to a downward side in the front surface side, thereby flowing out from each of the discharge ports 13, as shown in FIGS. 5 and 7.

The resonator 19 is arranged in a space between the surge tank 14 in a left end side of the intake manifold I and the discharge port 13 of the intake flow passage 11 in such a manner as to make a communication port (not shown) open to a lower portion side near a middle of the surge tank 14 in a lateral direction and arrange a communication passage 20 (refer to FIGS. 3 and 5) extending to a left side in a bottom surface side of the intake manifold I from the communication port.

Further, the intake manifold I is manufactured by vibration welding the respective members 21, 31, 43 and 45. The intake manifold I is manufactured first by previously forming an upper member U obtained by vibration welding the cover member 21 and the base member 31, and a lower member D obtained by vibration welding the tank resonator combined member 43 and the resonator bottom member 45, and vibration welding the base member 31 and the combined member 43, thereby connecting the upper and lower members U and D.

The bottom member 45 is arranged as a member for resonator covering a bottom portion side of the communication passage 20 and the resonator 19, and an upper member 42 of the resonator bottom member 45 is formed as a tank and resonator combined member for forming a lower portion side of the surge tank 14 and the resonator 19.

The base member 31 in an upper side of the combined member 42 is structured, as shown in FIGS. 5 and 7, such that a recess grooved distribution passage portion 35 forming a lower portion side of each of the distribution passages 15 is arranged in an upper surface side, a surge tank portion 32 forming an upper portion side of the surge tank 14 and an upper portion of the resonator 19 are formed in a lower surface side, and a ceiling wall portion 34 closing the upper end side of the resonator 19 is arranged. Four distribution ports 16 are open to the distribution passage portion 35 in a back surface side of the intake manifold I, and four discharge ports 13 are open to a front surface side of the intake manifold I.

A weld portion 37 for welding to the cover member 21 is arranged in a peripheral edge of the distribution passage portion 35 in the base member 31 so as to form four distribution passages 15. The weld portion 37 is structured, as shown by a dark color in FIG. 7, such that an upward protruding protrusion 38 is provided, and recess grooves 40 and 41 are formed in an inner peripheral side and an outer peripheral side of the protrusion 38 (refer to FIG. 8). The recess groove 41 is formed deeper than the recess groove 40 in such a manner as to receive an extension portion 29 of a cover wall 28 mentioned below.

The cover member 21 is a member for forming an outer wall of each of the distribution passages 15, as shown in FIGS. 4 to 6 and 8, and is structured such that the cover member 21 is provided with an assembled portion 22 integrally covering the side of the base portions 15a of the respective distribution passages 15, and branch portions 23 arranged so as to extend to the side of the leading end portions 15b of the respective distribution passages 15 from the assembled portion 22, corresponding to the number of the respective distribution passages 15 and separated from each other. Further, a weld portion 24 provided with a protrusion 25 in a protruding manner is arranged in an outer peripheral edge, in a lower surface of the cover member 21, in correspondence to the protrusion 38 of the weld portion 37 in the base member 31, as shown in by a dark color in FIG. 4. The weld portion 24 is structured such that the weld portion 24 is provided with the protrusion 25, and cover walls 27 and 28 arranged in an inner peripheral side and an outer peripheral side of the protrusion 25 with an interval H with respect to the protrusion 25.

A vibrating direction D at a time of vibration welding between the cover member 21 and the base member 31 is set to a lateral direction along the parallel arranging direction of the respective distribution passages 15, the protrusion 25 of the weld portion 24 makes a parallel protrusion portion 26 extending along the vibrating direction D to be arranged in the leading end 23a of each of the branch portions 23 in the cover member 21, and the protrusion 38 of the weld portion 37 is also provided with a parallel protrusion portion 39 extending along the vibrating direction D in correspondence to the parallel protrusion portion 26. In this case, in the embodiment, the parallel protrusion portions 26 and 39 extending along the vibrating direction D are arranged also in the side of the assembled portion 22 of the cover member 21.

Further, an extension portion 29 having a leading end (a lower end) 29a extended to a lower side than the outer cover wall 27 is arranged in the inner cover wall 28 of the protrusion 25 so as to be arranged at a position orthogonal to the vibrating direction D in the parallel protrusion portion 26. The extension portion 29 is arranged so as to prevent the burr B generated at a time of welding the parallel protrusion portions 26 and 39 from getting over the cover wall 27. A length L of the extension portion 29 protruding from the leading end 25a of the protrusion 25 before being welded is set in correspondence to a moving speed to the side of the recess groove 41 and a generation state of the burr B in such a manner that even in the case that the burr B is generated at a time when the leading end 29a of the extension portion 29 moves so as to be received within the recess groove 41, a leading end BT of the burr B is brought into contact with an inner side surface 29b of the extension portion 29 so as to be in a state of being prevented from getting over the extension portion 29.

Figure 8:
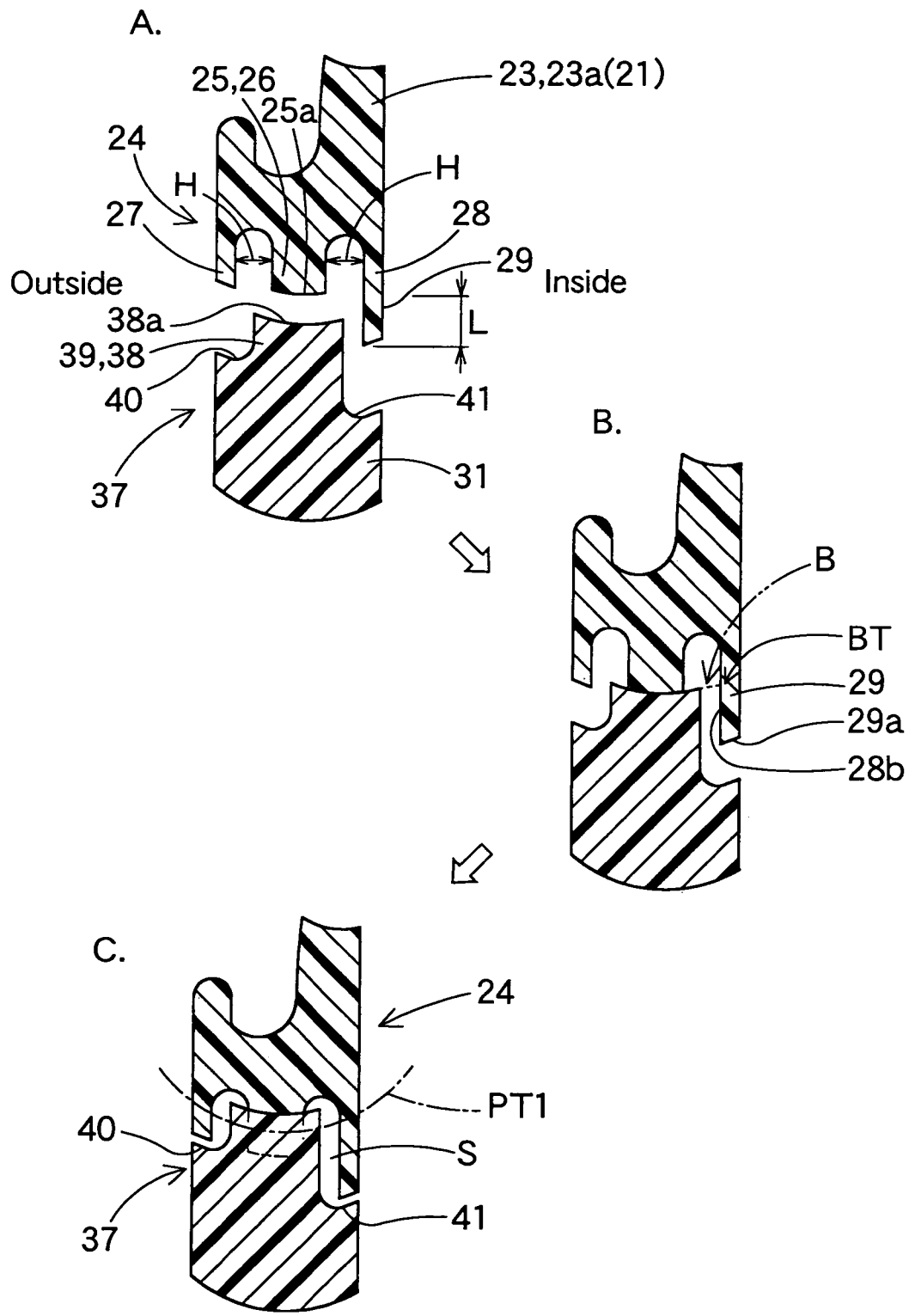
FIG. 8 is a view explaining a vibration welding time of the intake manifold.
Figure 9:
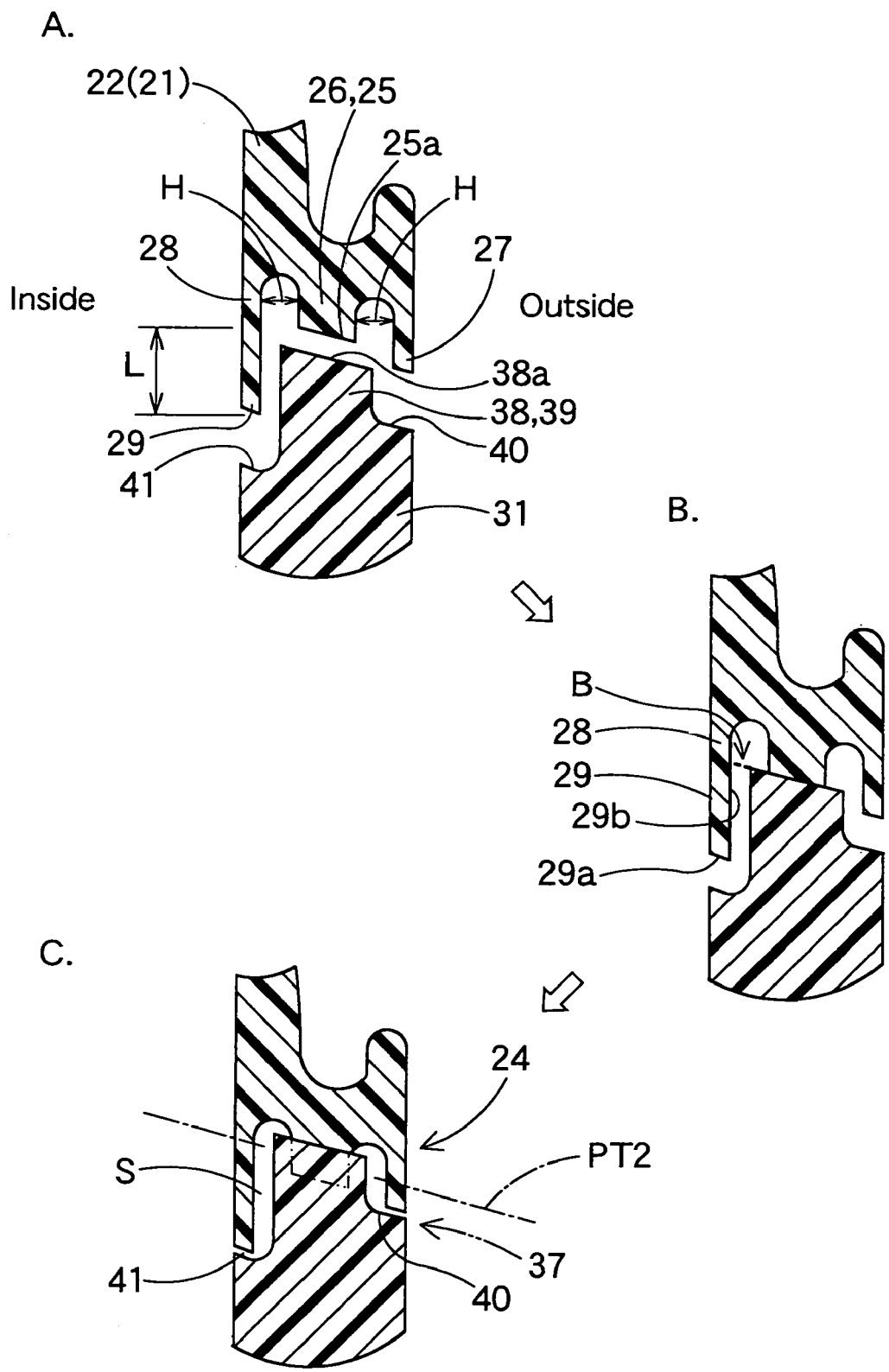
FIG. 9 is a view explaining a vibration welding time of the other portion of the intake manifold.

In this case, in the side of the leading end 23a of each of the branch portions 23, a set reference surface PT1 corresponding to a reference for designing the protrusions 25 and 38 and the cover walls 27 and 28 at a time of welding the weld portions 24 and 37 to each other is formed in a downward bulged circular arc shape, while taking into consideration the die cutting direction of the base member 31 and the connecting direction between the cover member 21 and the base member 31 in consideration of the inner peripheral surface of the discharge port 13, as shown in FIG. 8. Further, in the side of the assembled portion 22, a set reference surface PT2 of the weld portions 24 and 37 is formed in an inclined surface in which an inner side corresponding to the side of the distribution passage 15 is made higher in an upper side than an outer side, as shown in FIG. 9, while taking into consideration the die cutting direction of the cover member 21 near the weld portions 24 and 37 and the connecting direction between both the members 21 and 31.

Further, in manufacturing the intake manifold I in accordance with the embodiment, as mentioned already, there is a step of previously forming the upper member U obtained by welding the cover member 21 and the base member 31, and the lower member D obtained by welding the tank resonator combined member 43 and the resonator bottom member 45.

At this time, when forming the upper member U, the base member 31 is set to a predetermined jig for vibration welding, the cover member 21 is set to an upper side of the base member 31, and the cover member 21 is pressed and vibrated along the direction D by a predetermined pressurizing jig. Then, the protrusions 25 and 38 are molten and welded in the weld portions 24 and 37 between the corresponding cover member 21 and base member 31, and a lot of burrs are generated in the portion of the parallel protrusion portions 26 and 39.

However, in the side of the leading end 23a of the branch portion 23 in the cover member 21, as shown in FIGS. 8A and 8B, even when the burr B generated by the melting between the leading ends 25a and 38a of the protrusions 25 and 38 is going to extend in an approximately orthogonal direction from the parallel protrusion portions 26 and 39 so as to get over the cover wall 28 during the welding step, the extension portion 29 formed in the cover wall 28 so as to extend to the opposite base member 31 welded to the cover member 21 provided with the cover wall 28 stops the burr B by the inner surface 29b, and prevents the burr B from being exposed to the inner peripheral side of the intake manifold I.

Further, in the case that the welding is finished, since the extension portion 29 is arranged in the recess groove 41 of the opposite base member 31 as shown in FIG. 8C, and the burr B can be stayed in a space S in the side of the parallel protrusion portion 26 of the extension portion 29, it is possible to prevent the burr B from being scattered, even when the burr B is arranged in the inner peripheral side of the intake manifold I.

In the same manner, in the side of the assembled portion 22 of the cover member 21, as shown in FIGS. 9A and 9B, even when the burr B generated by the melting between the leading ends 25a and 38a of the protrusions 25 and 38 is going to extend in an approximately orthogonal direction from the parallel protrusion portions 26 and 39 so as to get over the cover wall 28 during the welding step, the extension portion 29 formed in the cover wall 28 stops the burr B by the inner surface 29b, and prevents the burr B from being exposed to the inner peripheral side of the intake manifold I. Further, in the case that the welding is finished, since the extension portion 29 is arranged in the recess groove 41 of the opposite base member 31 as shown in FIG. 9C, and the burr B can be stayed in the space S in the side of the parallel protrusion portion 26 of the extension portion 29, it is possible to prevent the burr B from being scattered, even when the burr B is arranged in the inner peripheral side of the intake manifold I.

The resin intake manifold I in accordance with the embodiment can be manufactured by forming the upper member U and thereafter vibration welding the tank resonator combined member 43 and the base member 31 in the previously formed lower member D.

Accordingly, in the resin intake manifold in accordance with the embodiment, it is possible to easily prevent the burr B generated at a time of vibration welding the cover member 21 and the base member 31 from being exposed to the inner peripheral side of the product I, only by arranging the extension portion 29, and it is possible to prevent the burr B from being scattered. It is possible to lower the manufacturing man-hour and cost at a degree that the inspection of presence of the burr B and the burr removing process can be simplified. Of course, since the burr B is not exposed to the inner peripheral side of the product I even in a state in which the set reference surfaces PT1 and PT2 of the weld portions 24 and 37 between the cover member 21 and the base member 31 corresponding to the separated bodies are arranged in the curved shape or the inclined shape, it is possible to freely set the die cutting direction at a time of molding the separated bodies 21 and 31 themselves and the connecting direction between the separated bodies 21 and 31 with no limitation by the burr B, and it is possible to improve a design freedom of the cover member 21 and the base member 31 corresponding to the separated bodies.

Further, in particular, in accordance with the embodiment, the vibrating direction D at a time of vibration welding the cover member 21 and the base member 31 is set to the lateral direction along the parallel arranging direction of the respective distribution passages 15, and the parallel protrusion portions 26 and 39 and the cover wall 28 provided with the extension portion 29 are arranged in the leading end 23a of each of the branch portions 23 in the cover member 21. In other words, in the cover member 21 mentioned above, an entire area of the weld portion 24 including the assembled portion 22 and the respective branch portions 23 is pressed and supported by the pressurizing jig used for vibration welding so as to be weld to the weld portion 37 of the opposing base member 31, at a time of vibration welding. However, the leading end 23a of each of the branch portions 23 is separated from each other and tends to be dispersed in the dimensional accuracy in comparison with the assembled portion 22. As a result, the dispersion is generated in the weld margin for welding, and the portion generating the burr B tends to be generated further, in addition to the matter that this portion is in the parallel protrusion portions 26 and 37 tending to generate the burr B. However, in the embodiment, since the cover wall 28 provided with the extension portion 29 is arranged in the portion tending to generate the burr B, it is possible to accurately cover the burr B.

Of course, even in the case that the vibrating direction D is set to the lateral direction extending along the parallel arranging direction of the respective distribution passages 15 at a time of welding, and the respective distribution passages 15 are arranged spirally in the outer peripheral side of the intake manifold I from the upstream side of the intake fluid F to the downstream side, the cover member 21 can be smoothly vibrated so as to be welded to the base member 21, in the case of the embodiment. In the case of setting the vibrating direction D of the vibration welding to the approximately orthogonal direction to the parallel arranging direction of the respective distribution passages 15, that is, the longitudinal direction of the intake manifold I corresponding to the direction extending along the respective distribution passages 15, the entire area of the weld portions 25 and 37 is not in contact smoothly, it is hard to properly generate the friction heat and it is impossible to vibration weld.

Further, in the embodiment, the cover wall 28 provided with the extension portion 29 is arranged in the inner side of the respective distribution passages 15 in the parallel protrusion portions 26 and 39, there is no risk that the burr B is scattered into the distribution passage 15, and it is possible to prevent an engine trouble caused by the burr B.

Figure 10:
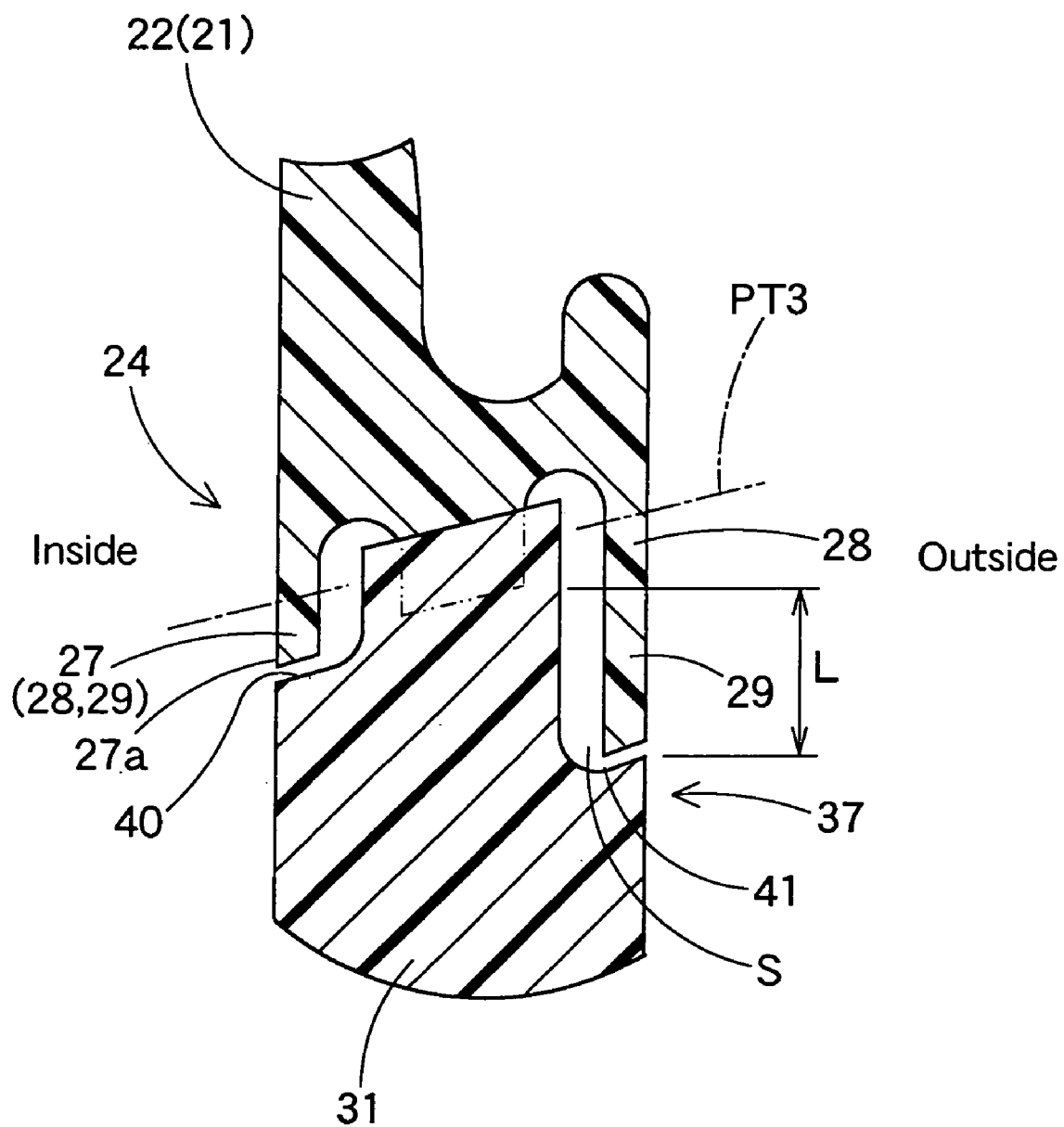
FIG. 10 is an enlarged cross sectional view showing a vibration welding structure in accordance with a modified embodiment of the intake manifold.

In this case, the embodiment shows the case that the cover wall 28 provided with the extension portion 29 is arranged in the inner side of the respective distribution passages 15 in the parallel protrusion portions 26 and 39, however, the cover wall 28 provided with the extension portion 29 may be arranged in an outer side of the parallel protrusion portions 26 and 39 as far as the cover wall 28 provided with the extension portion 29 is arranged in a side to which the burr B tends to be extended. For example, as shown in FIG. 10, in the assembled portion 22 of the cover member 21, a set reference surface PT3 of the weld portions 24 and 37 can be formed as an inclined surface in which an inner side corresponding to the side of the distribution passage 15 is made lower than an outer side, in consideration of the die cutting direction of the cover member 21 near the weld portions 24 and 37, and the connecting direction of both the members 21 and 31. In the case of this structure, even when the burr B generated by the welding between the leading ends 25a and 38a of the protrusions 25 and 38 is going to extend in the approximately orthogonal direction from the parallel protrusion portions 26 and 39 so as to get over the cover wall 28 during the welding step, at a time of vibration welding the weld portions 24 and 37, as shown in FIGS. 11A and 11B, the extension portion 29 formed in the cover wall 28 stops the burr B by the inner surface 29b, and prevents the burr B from being exposed to the outer peripheral side of the intake manifold I, and it is possible to manufacture the intake manifold I with an improved outer appearance design.

Figure 11:
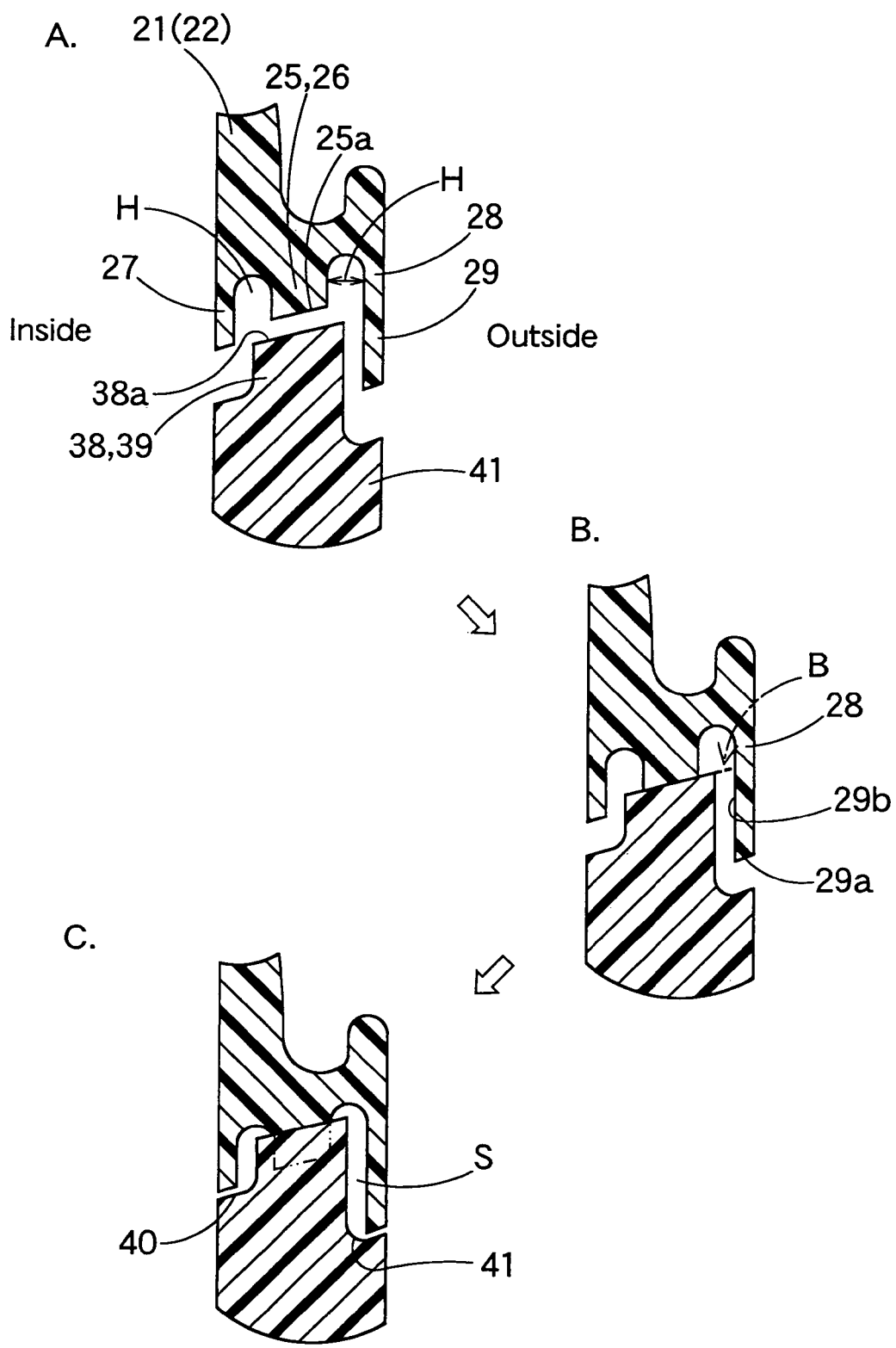
FIG. 11 is a view explaining a vibration welding time of a portion of the structure shown in FIG. 10.
Figure 12:
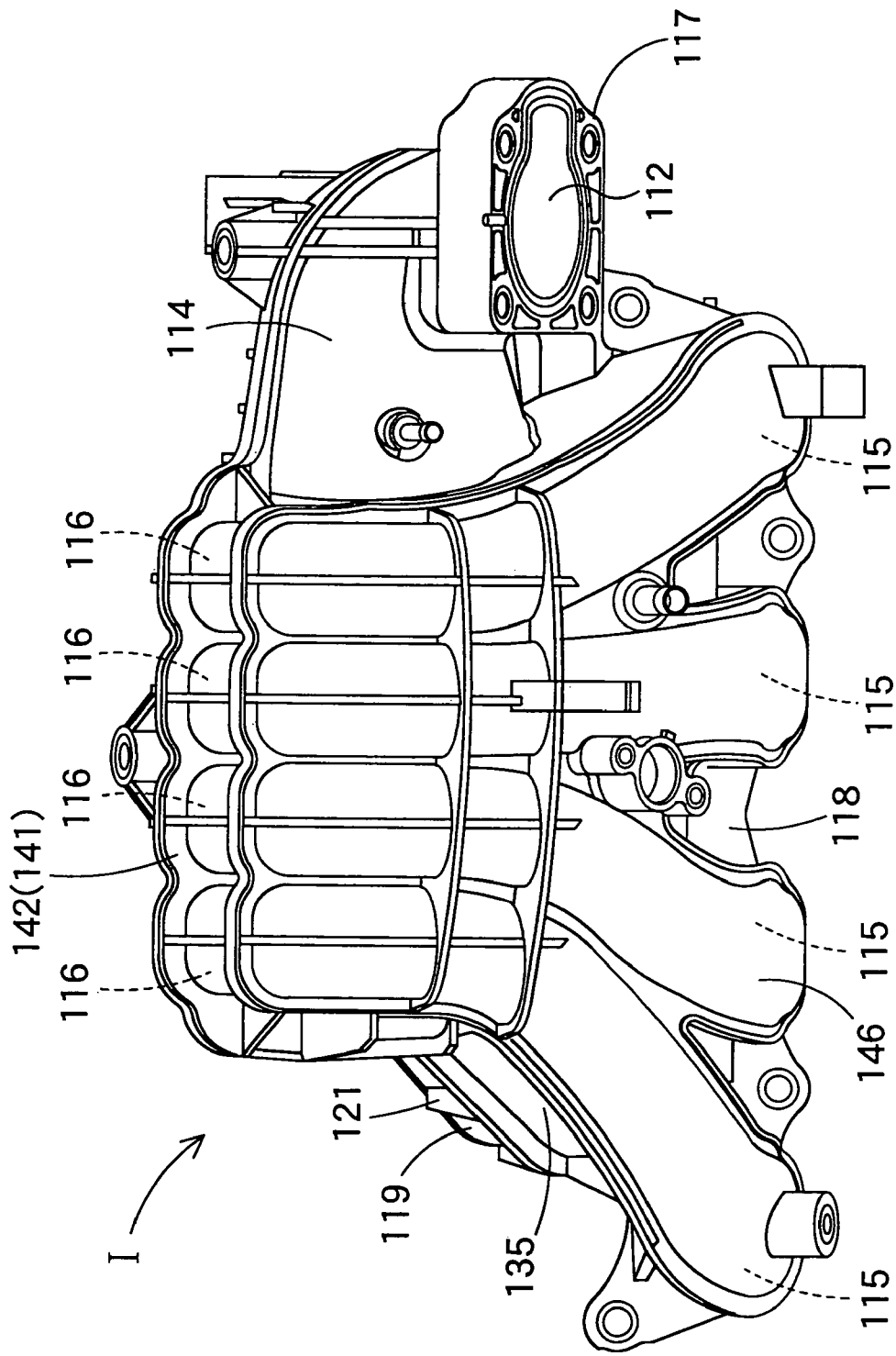
FIG. 12 is a plan view of a resin intake manifold in accordance with a second embodiment of the present invention.
Figure 13:
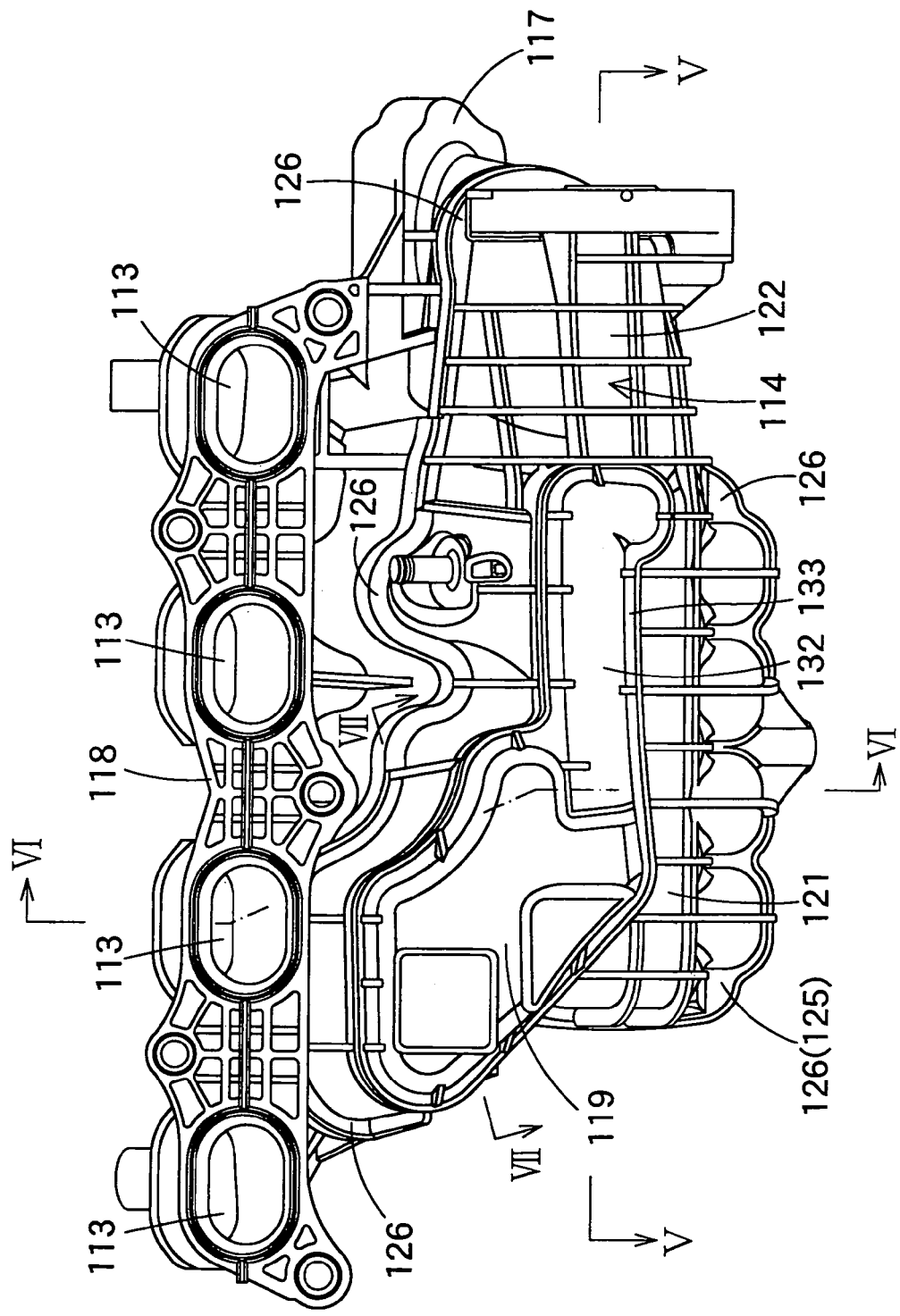
FIG. 13 is a bottom elevational view of the intake manifold.

In the case of a structure shown in FIGS. 10 and 11, that is, in the case that the set reference surface PT2 of the weld portions 24 and 37 is an inclined surface in which the inner side corresponding to the side of the distribution passage 15 is made lower than the outer side, the cover wall 27 is in a state of being provided with the extension portion in the leading end 27a, on the basis of an angle of incline, and it is possible to stop the burr B extending to the inner side in the side of the distribution passage 15. In view of this matter, the extension portion 29 may be arranged in both sides comprising the inner side and the outer side of the parallel protrusion portion 26.

FIGS. 12 to 22 show a second embodiment in accordance with the present invention. A resin intake manifold I in accordance with the second embodiment is constituted by four separated bodies which are respectively formed by a thermoplastic synthetic resin such as 6 nylon with filler or the like and comprise a first piece 121, a second piece 135, a third piece 132 and a fourth piece 146, as shown in FIGS. 12 to 17. Further, the intake manifold I in accordance with the second embodiment is assembled between a throttle body (not shown) and a cylinder head side of an engine, and is structured such that a flow passage 111 of an intake fluid F (refer to FIG. 6), and a tank chamber 119 communicated with a part of the intake flow passage 111 are provided. Further, the intake flow passage 111 is structured such as to be provided with a surge tank 114 positioned in an upstream side, and distribution passages 115 for distributing an intake fluid F from the surge tank 114 to respective cylinders of the engine. The tank chamber 119 in accordance with the second embodiment is structured as a resonator 119 communicated with the surge tank 114 so as to intend a noise reduction and an improvement of an output torque. Further, four distribution passages 115 are arranged in the case of the embodiment.

The fluid F passing through the throttle valve is flowed into the intake flow passage 111 from an intake port 112, and is discharged from four discharge ports 113 so as to pass through the surge tank 114 of the intake flow passage 111 and the distribution passages 115 and flow into the engine side. The intake port 112 is arranged in a right end side of the intake manifold I so as to be open to a diagonally upper side, and a flange portion 117 connected to a side of a throttle body (not shown) is formed in the periphery of the intake port 112. Each of the discharge ports 113 is arranged so as to be open to a downward direction in a front surface side of the intake manifold I, and a flange portion 118 connected to a side of an engine (not shown) is formed in the periphery of each of the discharge ports 113.

Figure 19:
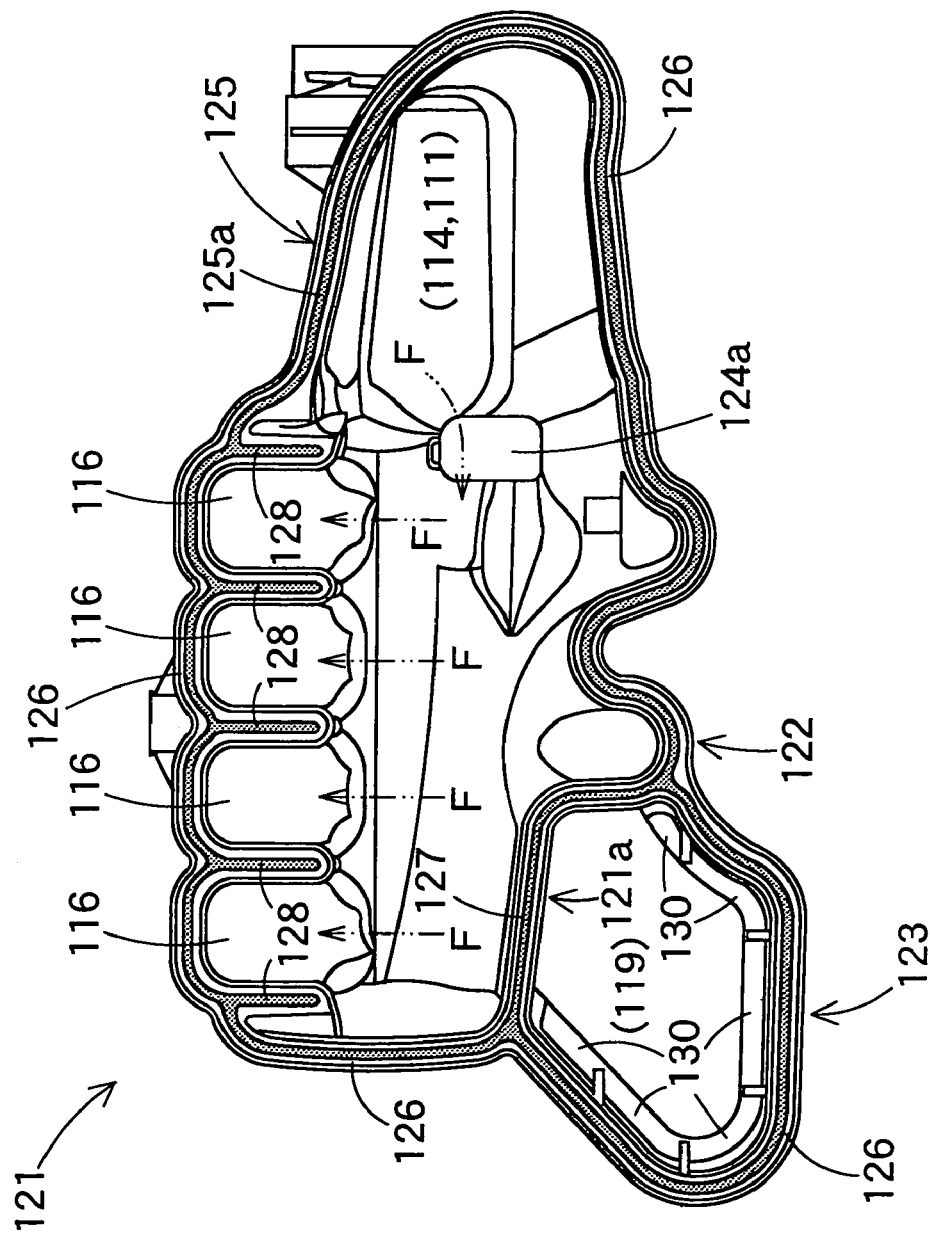
FIG. 19 is a plan view showing the first piece of the intake manifold.

The surge tank 114 is arranged such as to extend approximately in a cylindrical shape from the intake port 112 to a left side by setting the side of the intake port 112 to a right end side. Four distribution ports 116 communicating with the respective distribution passages 115 are arranged in parallel in a back surface side of the intake manifold I in the surge tank 114. Each of the distribution passages 115 is arranged so as to extend from a back surface side of the intake manifold I toward an upper surface side, and extend from the upper surface side to a lower side in a front surface side. In other words, the fluid F flowing from the intake port 112 flows to a left side from a right end side of the surge tank 114, as shown in FIGS. 15, 19 and 20, flows into each of the distribution passages 115 from each of the distribution ports 116 toward the upper side, as shown in FIG. 16, flows from a back surface side of the intake manifold I to an upper surface side in each of the distribution passages 115, and flows to a downward side in the front surface side, thereby flowing out from each of the discharge ports 113.

Figure 20:
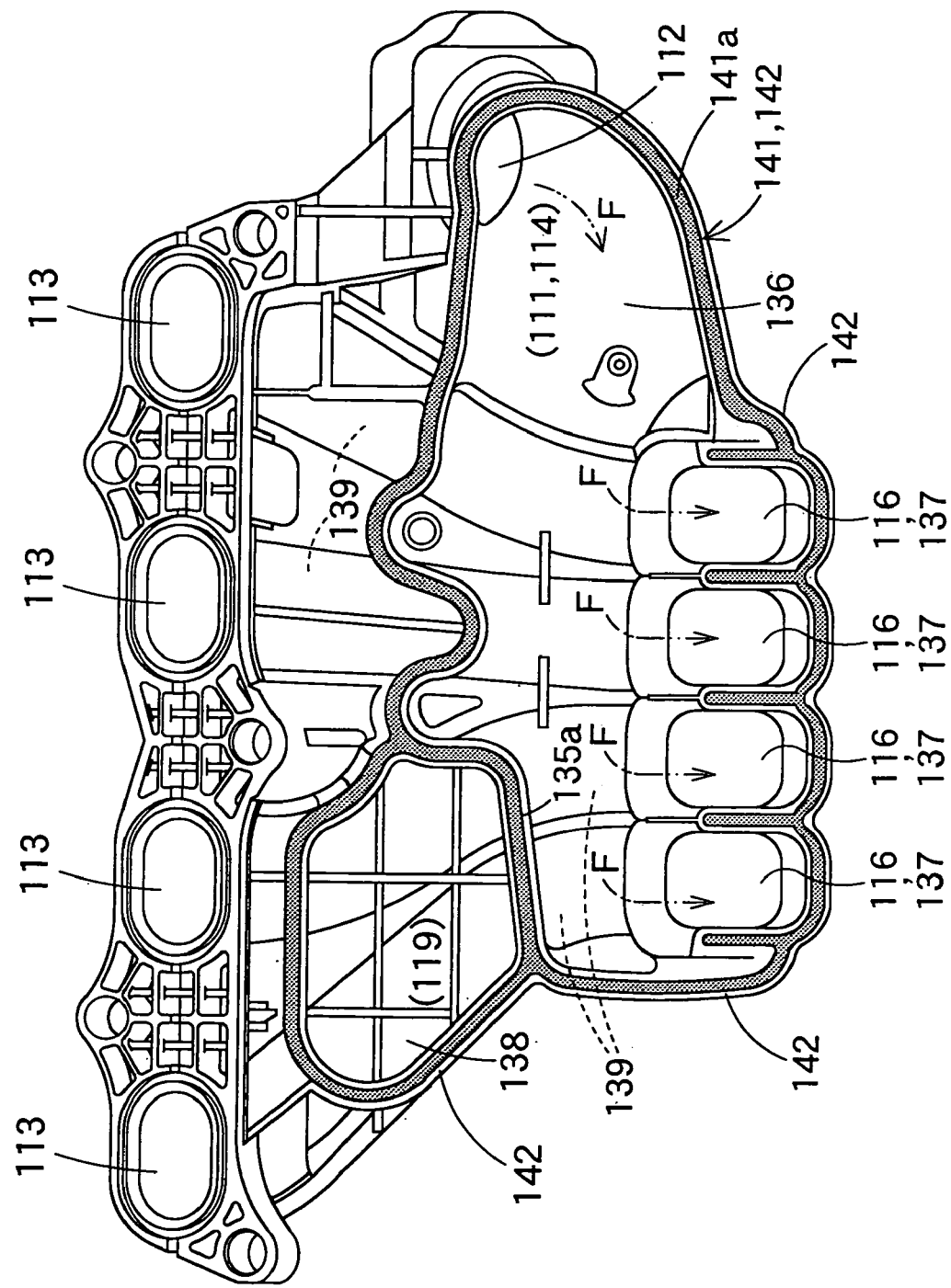
FIG. 20 is a bottom elevational view showing a second piece of the intake manifold.
Figure 21:
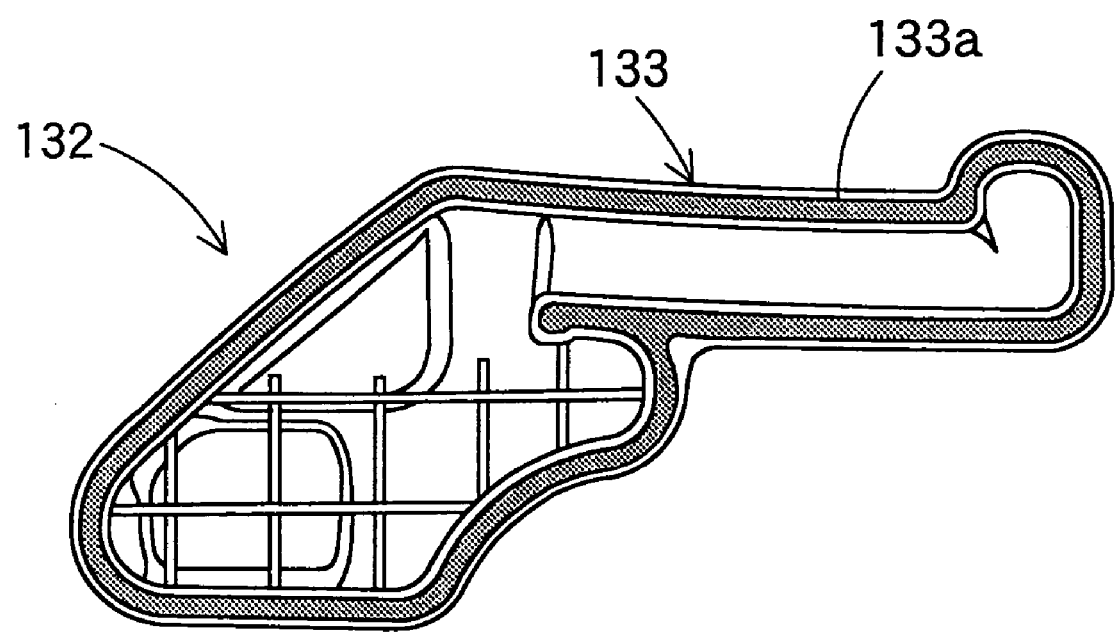
FIG. 21 is a plan view showing a third piece of the intake manifold.

Further, the resonator 119 is arranged in a space between the surge tank 114 in a left end side of the intake manifold I and the discharge port 113 of the intake flow passage 111 in such a manner as to make a communication port 124a open to a lower portion side near a middle of the surge tank 114 in a lateral direction and arrange a communication passage 124 extending to a left side in a bottom surface side of the intake manifold I from the communication port 124a (refer to FIG. 20).

Further, the arrangement of four respective pieces 121, 132, 135 and 146 is structured such that the third piece 132, the first piece 121, the second piece 135 and the fourth piece 146 are arranged in sequence from the bottom portion side of the intake manifold I. The intake manifold I is manufactured by vibration welding the respective pieces 121, 132, 135 and 146. The intake manifold I is manufactured first by previously forming an upper member U obtained by welding the fourth piece 146 and the second piece 135, and a lower member D obtained by welding the first piece 121 and the third piece 132, and vibration welding the first piece 121 and the second piece 135, thereby connecting the upper and lower members U and D.

Figure 14:
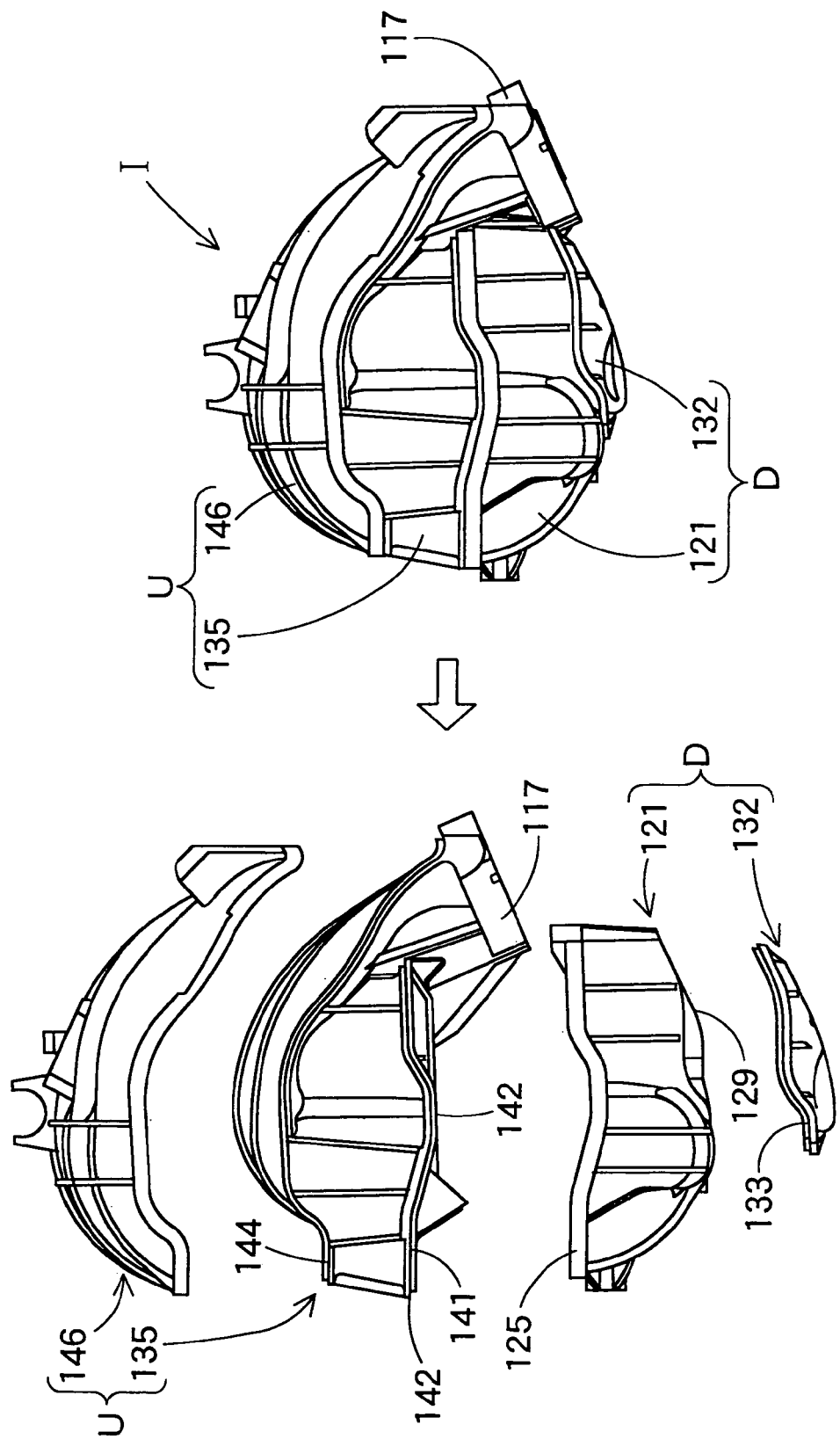
FIG. 14 is a view showing a left side elevational view of the intake manifold and an exploded state thereof.
Figure 15:
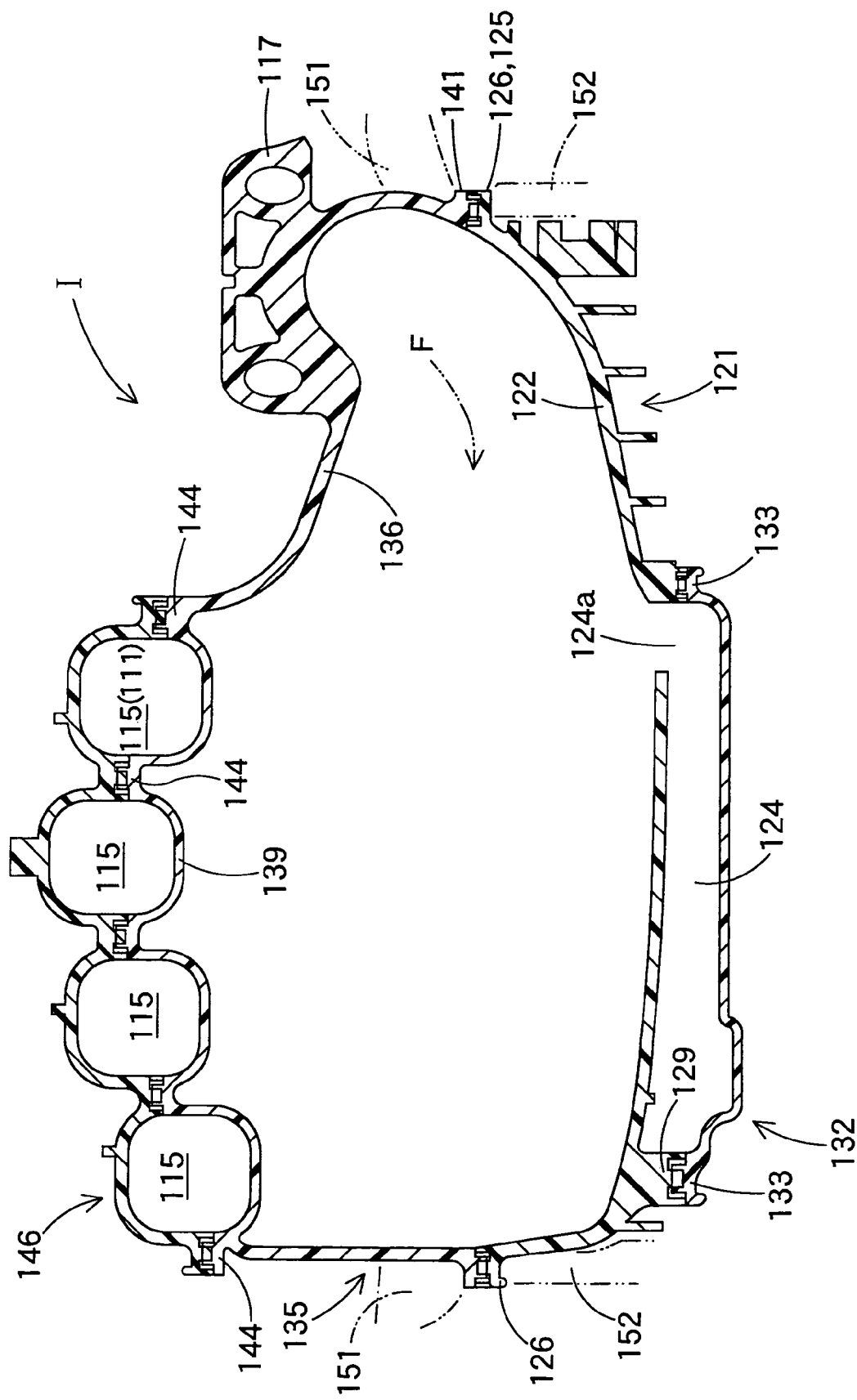
FIG. 15 is a vertical cross sectional view of the intake manifold and corresponds to a portion along a line V-V in FIG. 13.
Figure 16:
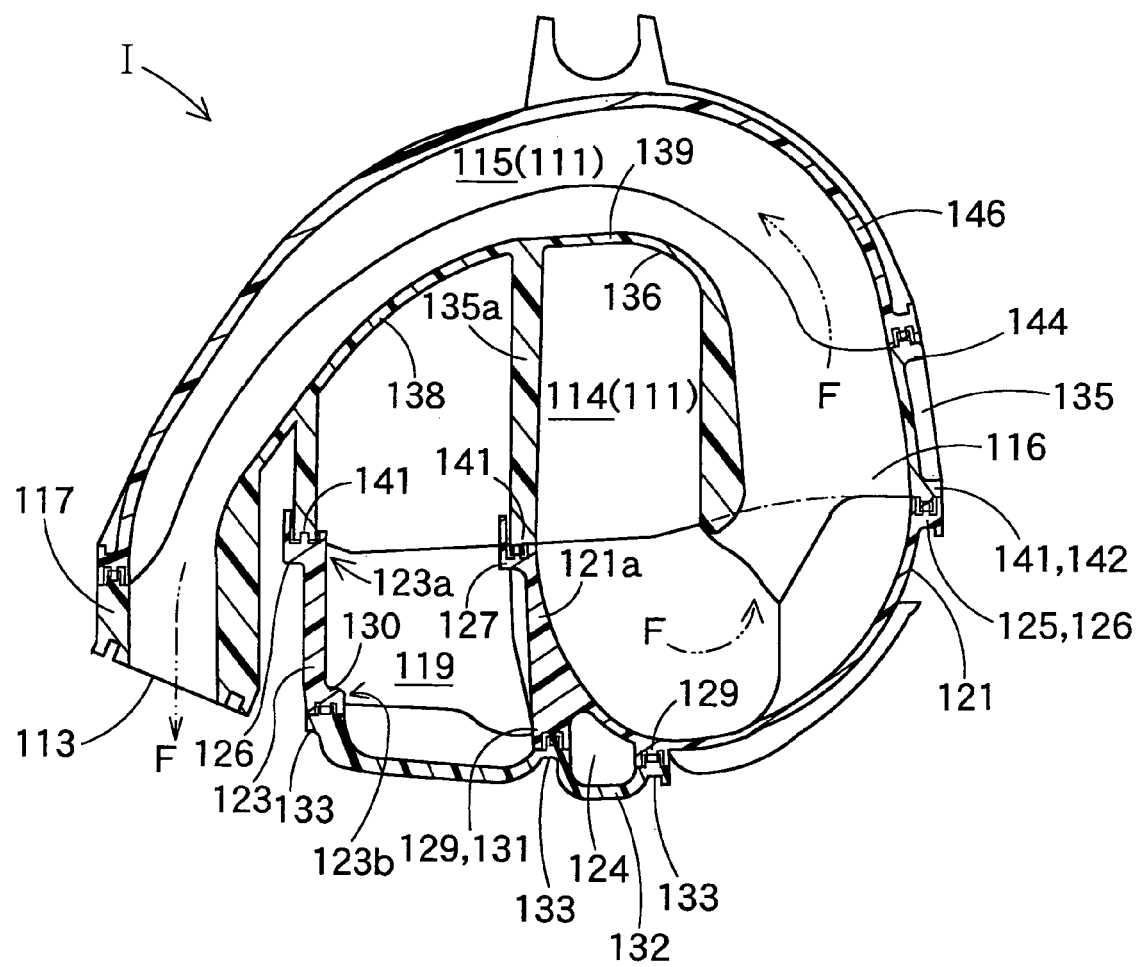
FIG. 16 is a vertical cross sectional view of the intake manifold and corresponds to a portion along a line VI-VI in FIG. 13.

Further, as shown in FIGS. 12 and 14 to 16, the fourth piece 146 constitutes an upper cover member sectioning and covering the upper portion side of each of the distribution passages 115. Further, the second piece 135 is structured, as shown in FIGS. 14 to 16, such that a recess grooved distribution passage portion 139 forming a lower portion side of each of the distribution passages 115 is arranged in an upper surface side, a surge tank portion 136 forming an upper portion side of the surge tank 114 and an upper portion of the resonator 119 are formed in a lower surface side, and a ceiling wall portion 138 closing the upper end side 123a of the peripheral wall portion 123 of the resonator 19 in the first piece 121 is arranged.

In a lower surface side of the second piece 135, as shown in FIGS. 16 and 20, the surge tank portion 136 and the ceiling wall portion 138 are arranged with holding a common wall portion 135a therebetween. Further, a portion to which a dark color is applied in FIG. 20 corresponds to a weld portion 141 to the first piece 121. The first piece weld portion 141 including a lower end surface of the common wall portion 135a is arranged in a lower end surface of a wall portion in the surge tank 136 and a lower end surface of the ceiling wall portion 139, and is provided with a protrusion 141a melting in a leading end (a lower end) at a time of welding. Further, the weld portion 141 is structured as an outward protruding weld collar portion 142 as shown in FIGS. 12, 14 to 16 and 20, in right and left side surface portions and a back surface portion of the intake manifold I.

Figure 17:
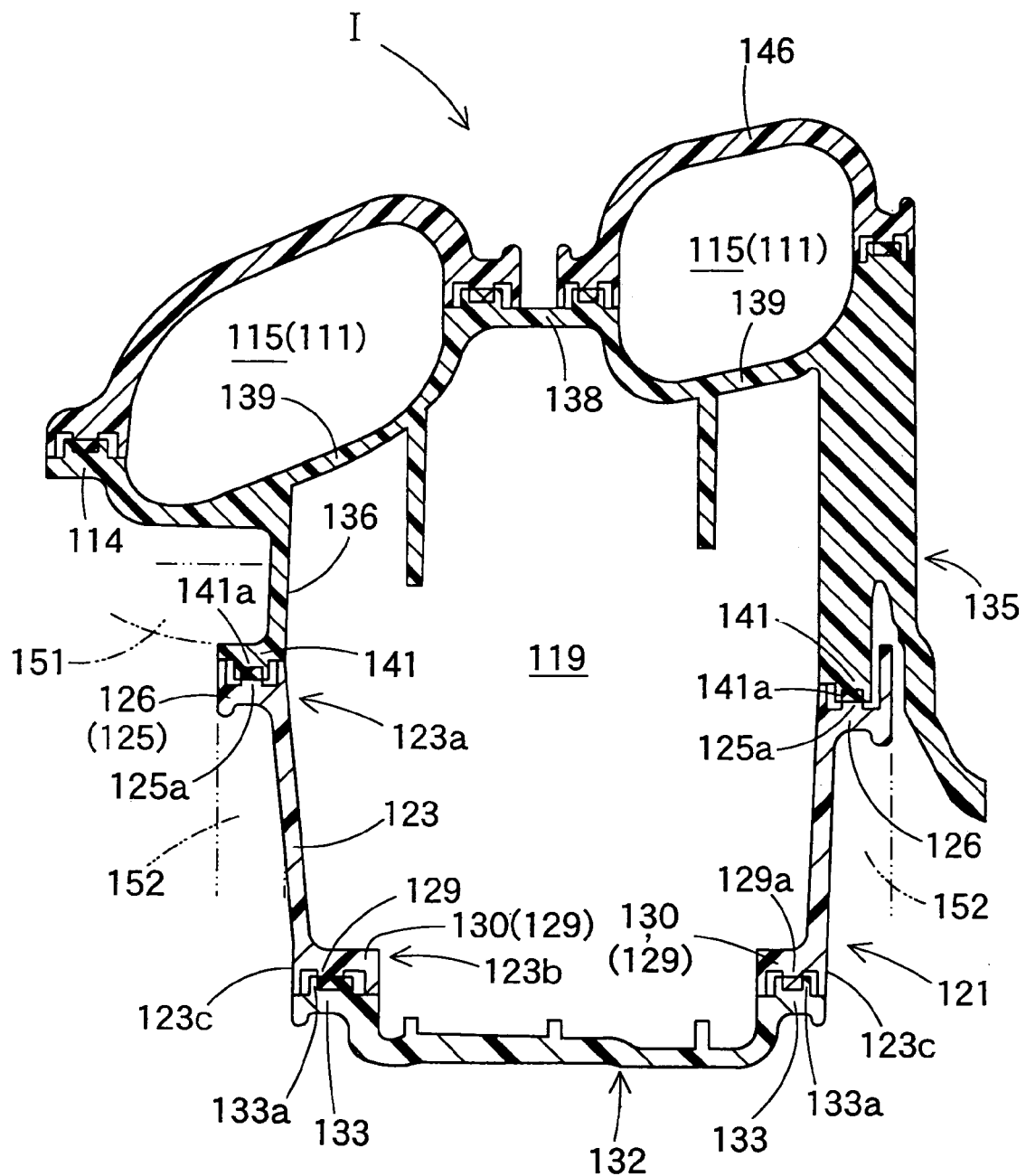
FIG. 17 is a vertical cross sectional view of the intake manifold and corresponds to a portion along a line VII-VII in FIG. 13.
Figure 18:
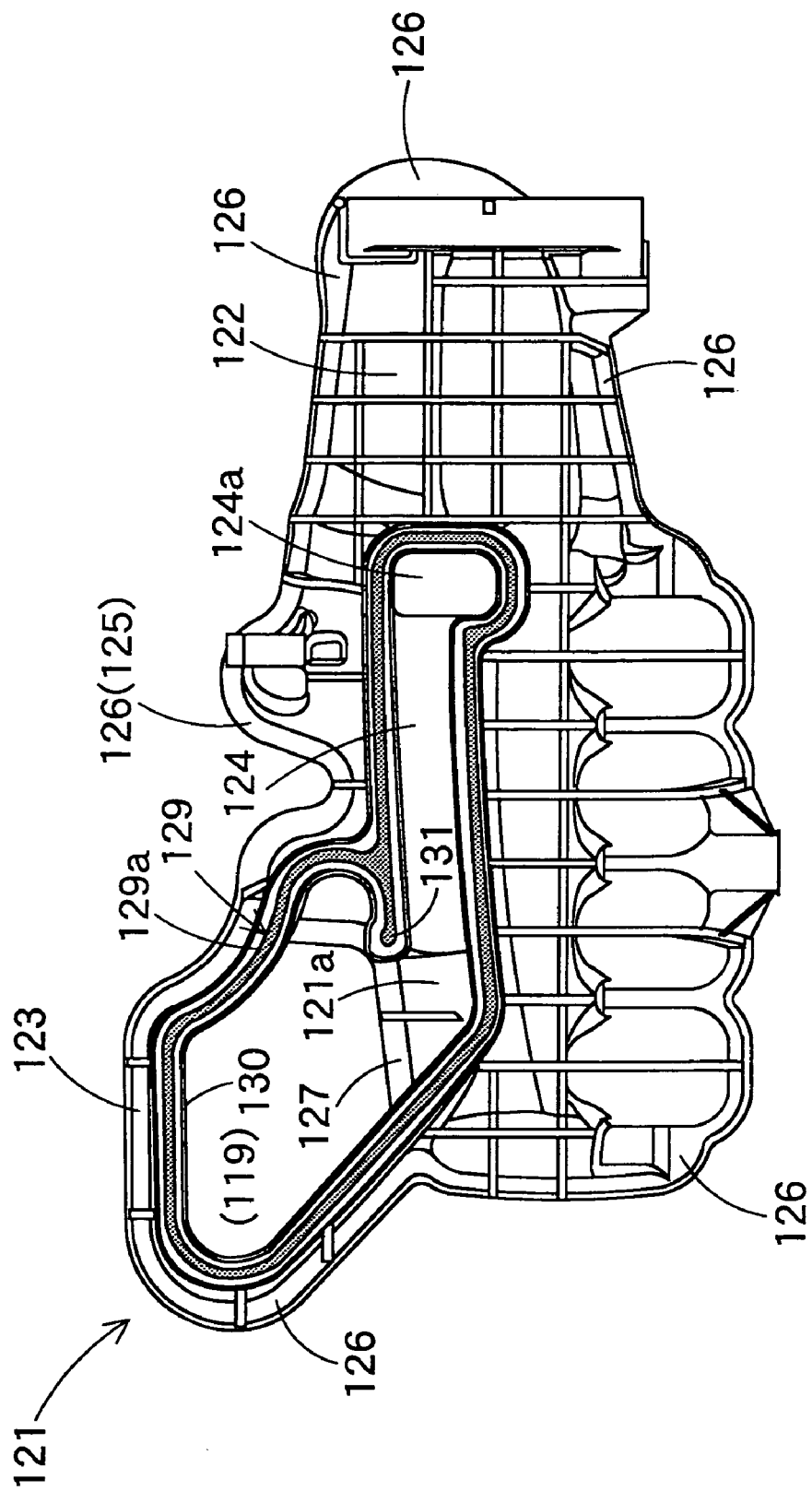
FIG. 18 is a bottom elevational view showing a first piece of the intake manifold.

The first piece 121 is structured such that the first piece 121 is provided with a main body wall portion 122 forming the lower portion side of the surge tank 114, as shown in FIGS. 13, 15, 18 and 19, and a peripheral wall portion 123 having an approximately square tubular shape for forming the resonator 119. A recess grooved communication passage 124 communicating with the resonator 119 is arranged in a lower surface of the first piece 121, as shown in FIGS. 15, 16 and 18, and a communication port 124a penetrating vertically is open to a right end of the communication passage 124, as shown in FIGS. 15, 18 and 19. The resonator peripheral wall portion 123 is provided with a wall portion 121a commonly used with the main body wall portion 122, and is formed in a taper shape tapered toward the lower end 123b as shown in FIG. 17.

A second piece weld portion 125 is arranged in an upper surface side of the first piece 121, as shown by a dark color in FIG. 19, in correspondence to the first piece weld portion 141 of the second piece 135 so as to be welded to the second piece 135. The weld portion 125 is constituted by an outer weld collar portion 126, a common wall portion weld portion 127, and a distribution port portion weld portion 128. The outer weld collar portion 126 is arranged in an entire periphery of an outer peripheral edge of the first piece 121 including the peripheral wall portion 123, and is formed so as to protrude to an outer side. The common wall portion weld portion 127 is arranged on an upper end surface of the common wall portion 121a. Further, the distribution port portion weld portion 128 is arranged in a peripheral edge of each of the distribution ports 116. A protrusion 125a melting in a leading end (an upper end) at a time of welding is formed in the weld portion 125 (126, 127, 128). In this case, the common wall portion weld portion 127 is structured as a weld collar portion 127 protruding to an inner peripheral surface of the peripheral wall portion 123, as shown in FIGS. 16 and 18.

A third piece weld portion 129 is arranged in a lower surface side of the first piece 121, as shown by a dark color in FIG. 18, in such a manner as to be welded to the third piece 132, and a protrusion 129a melting in a leading end (a lower end) at a time of welding is formed in the weld portion 129. Further, the third piece weld portion 129 is structured as an inner weld collar portion 130 protruding to an inner peripheral surface side of the peripheral wall portion 123 in the other portions than the portion of the common wall portion 121a in the resonator peripheral wall portion 123, as shown in FIGS. 17 and 19, and is arranged in an inner peripheral side of the peripheral wall portion 123 so as to prevent the portion of the weld collar portion 130 from being interfered with a pressurizing jig 152 supporting the outer weld color portion 126 at a time of welding the second piece weld portion 125 of the first piece 121 to the first piece weld portion 141 of the second piece 135. In this case, as shown in FIGS. 16 and 18, the portion 131 of the common wall portion 121a in the weld portion 129, it is arranged in a lower end surface of the common wall portion 121a without protruding to inner and outer peripheries of the peripheral wall portion 123. Further, in a portion apart from the peripheral wall portion 123 of the weld portion 129, it is arranged in the lower surface of the main body wall portion 122, as shown in FIGS. 15 and 16.

The third piece 132 is arranged in a bottom surface of the intake manifold I as shown in FIGS. 13 to 17 and 21, and is structured as a cover member closing a side of the end portion 123b in a lower side of the peripheral wall portion 123 in the resonator 119. In the embodiment, not only the lower side of the peripheral wall 123 itself, but also the lower side of the communication passage 124 including the communication port 124a is covered. An upper surface side of the outer peripheral edge in the third piece 132 is provided with a protrusion 133a melting in a leading end (an upper end) at a time of welding, and a weld portion 133 welded to the third piece weld portion 129 of the third piece 121 is formed therein.

In manufacturing the intake manifold I in accordance with the embodiment, as already mentioned, there is first a step of previously forming the upper member U obtained by welding the fourth piece 146 and the second piece 135, and the lower member D obtained by welding the first piece 121 and the third piece 132. At this time, as shown in FIG. 22A, the lower member D can be formed by reversing the tapered peripheral wall portion 123 tapered to the end portion 123b in the first piece 121 up and down, setting the peripheral wall portion 123 so as to be fitted to the pressurizing jig 148, setting the third piece 132 in the upper side thereof, bringing the weld portions 125 and 133 into contact with each other, setting the pressurizing jig 149 to the upper side of the third piece 132 as shown in FIG. 22B, pressing the pressurizing jig 149 to the lower side, vibrating the pressurizing jig 149, and welding the weld portions 129 and 133 to each other. Further, after forming the upper member U and the lower member D, the intake manifold I can be manufactured by utilizing pressurizing jigs 151 and 152, or the like and vibration welding the second piece weld portion 125 of the first piece 121, and the first piece weld portion 141 of the second piece 135, as shown by a two-dot chain line in FIGS. 15 and 17.

Further, in the resin intake manifold I in accordance with the second embodiment, even in the case that the outer weld collar portion 126 for welding to the second piece 135 is provided in one end portion 123a of the peripheral wall portion 123 in the first piece 121, the weld portion 129 to the third piece 132 in another end portion 123b of the peripheral wall portion 123 is formed as the inner weld collar portion 130 which can prevent an interference with the pressurizing jig 52 supporting the outer weld collar portion 126 at a time of welding the first piece 121 to the second piece 135.

Figure 22:
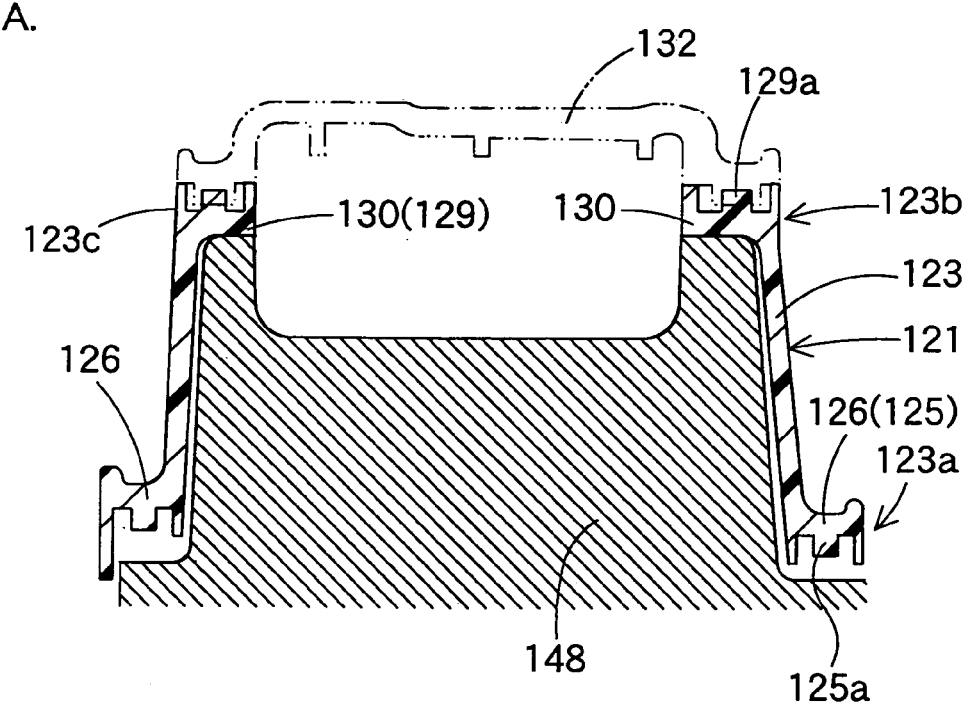
FIG. 22 is a view explaining a time of welding the first piece to the third piece.
Figure 22:
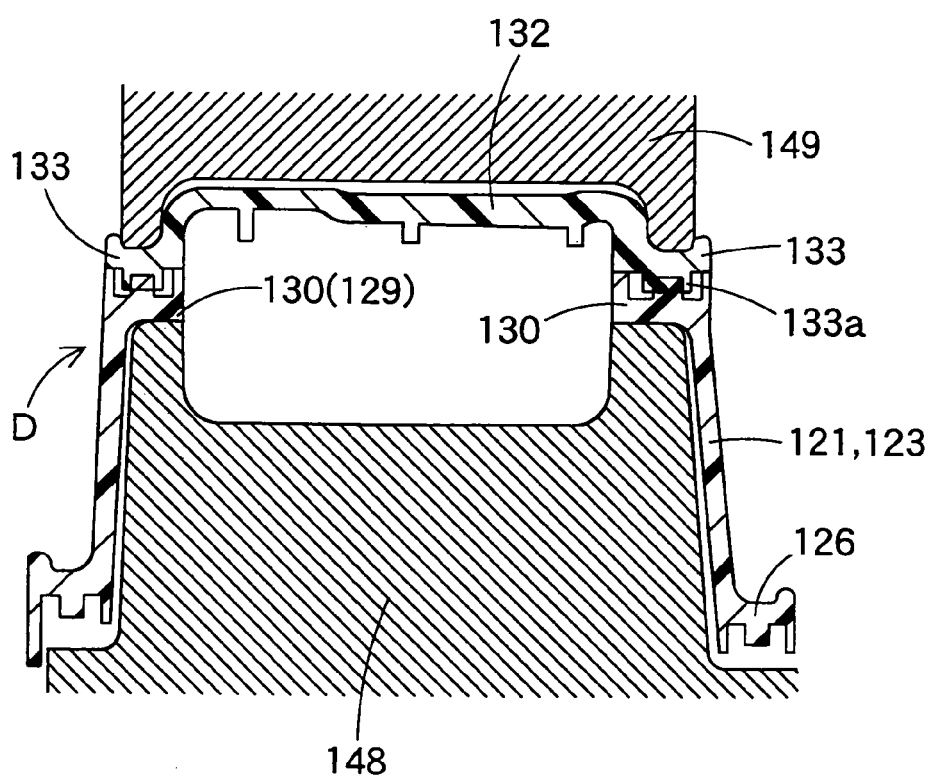

Accordingly, at a time of welding the first piece 121 to the third piece 132, as shown in FIG. 22, the inner weld collar portion 130 of the peripheral wall portion 123 can be supported by the pressurizing jig 148 arranged in the inner peripheral side of the peripheral wall portion 123. Since the pressurizing jig 148 can be formed as a simple structure which is not necessary to be slid, the welding cost is not increased, and the inner weld collar portion 130 can be firmly supported in the inner peripheral side of the peripheral wall portion 123, it is not necessary to increase the weld time unnecessarily and the welding man-hour is not increased.

Of course, since the first piece 121 can be welded to the second piece 135 by utilizing the outer weld collar portion 126 which is easily supported by the pressurizing jig 152, it is possible to easily secure a sufficient strength in welding the first and second pieces 121 and 135 to each other.

Accordingly, in the resin intake manifold I in accordance with the second embodiment, even in the case that the resonator 119 corresponding to the tank chamber formed over three welded pieces 121, 135 and 132 is integrally provided, the increase of the welding cost and man-hour is restricted as much as possible. Accordingly, it is possible to manufacture the intake manifold I while restricting the increase of the manufacturing man-hour and cost.

Even in the case that the inner weld collar portion 130 is structured such as to protrude to the inner portion of the peripheral wall portion 123, the inner weld collar portion 130 is provided in the tank chamber 119 which does not structure the fluid passage 111 of the intake fluid F, and there is no risk that an influence is exerted to the flow of the intake fluid F.

Further, in the embodiment, the peripheral wall portion 113 of the first piece 121 is formed in a forward tapered shape from the outer weld collar portion 126 extending along the axial direction to the inner weld collar portion 130. Accordingly, the end portion 123b of the peripheral wall portion 123 in the side of the inner weld collar portion 130 can be made small in an outer shape thereof, and it is possible to further prevent the interference with the pressurizing jig 152 supporting the outer weld collar portion 126 at a time of welding the first piece 121 to the second piece 135. As a result, the pressurizing jig 152 can stabilize the support of the outer weld collar portion 130 of the first piece 121, and can improve a welding strength between the first and second pieces 121 and 135.

In this case, even in the case that the peripheral wall portion 123 is formed in the forward tapered shape from the outer weld collar portion 126 extending along the axial direction to the inner weld collar portion 130, the capacity of the peripheral wall portion 123 can be secured as large as possible. In other words, since the inner weld collar portion 130 is provided in an inner peripheral side in the end portion 123b of the forward tapered peripheral wall portion 123, the outer side portion 123c (refer to FIG. 17) of the peripheral wall portion 123 at the position can be arranged at an outer position up to a position close to the position along the axial direction of the peripheral wall portion 123 in the outer weld collar portion 126 as close as possible within the range that can maintain the taper shape. Accordingly, it is possible to arrange the end portion 123b of the peripheral wall portion 123 in the side of the inner weld collar portion 130 in an outer side of the peripheral wall portion 123 in a radial direction as close as possible, and it is possible to secure the capacity of the peripheral wall portion 123 large.

Further, in the embodiment, the intake flow passage 111 formed by the first piece 121 is structured such as to form a part of the surge tank 114, the resonator 119 is arranged in a dead space between the surge tank 114 and the discharge port 113 of the intake flow passage 111, and the intake manifold I provided in the resonator 119 can be structured compact. Further, even in the case that the resonator 119 is provided in the dead space, it is possible to stably support the weld portion by the predetermined pressurizing jigs 148, 149, 151 and 152, not only in the welding between the first and third pieces 121 and 132 in the peripheral wall portion 123 of the resonator 119, but also in the welding between the first and second pieces 121 and 135. Accordingly, it is possible to sufficiently secure the strength and it is possible to easily carry out the vibration welding.

In the case, in the intake manifold I in accordance with the embodiment, there is shown the case that the intake manifold I is structured by four pieces 121, 132, 135 and 146, however, the present invention can be applied to the resin intake manifold structured by three pieces or five or more pieces.

Further, in the present embodiment, the resonator 119 is exemplified as the tank chamber provided in the intake manifold I, however, the surge tank, an accumulator tank communicated with a diaphragm chamber or the like can be additionally exemplified as the tank chamber, and the present invention can be applied thereto.

Figure 23:
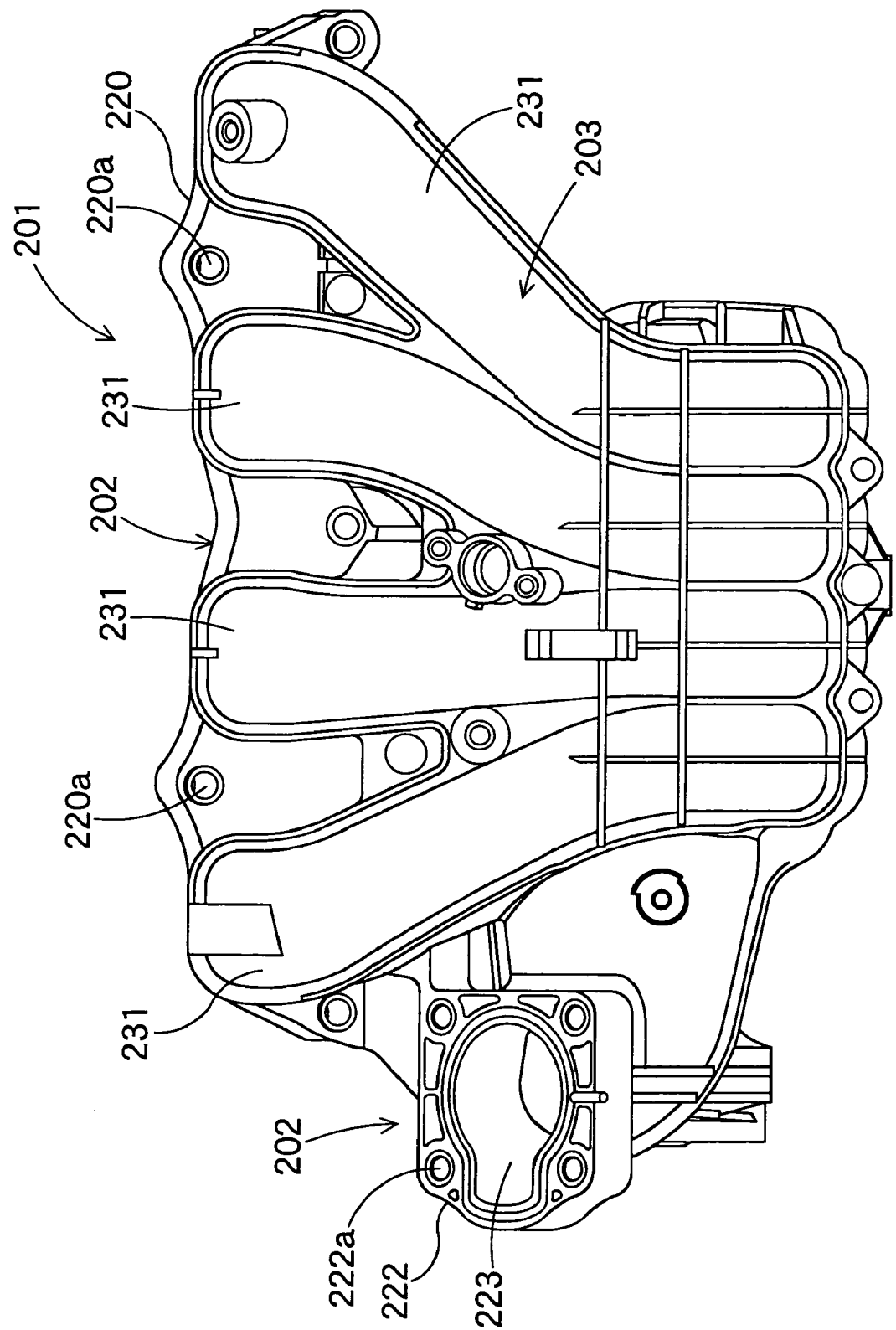
FIG. 23 is a front elevational view of a resin intake manifold in accordance with a third embodiment of the present invention.
Figure 24:
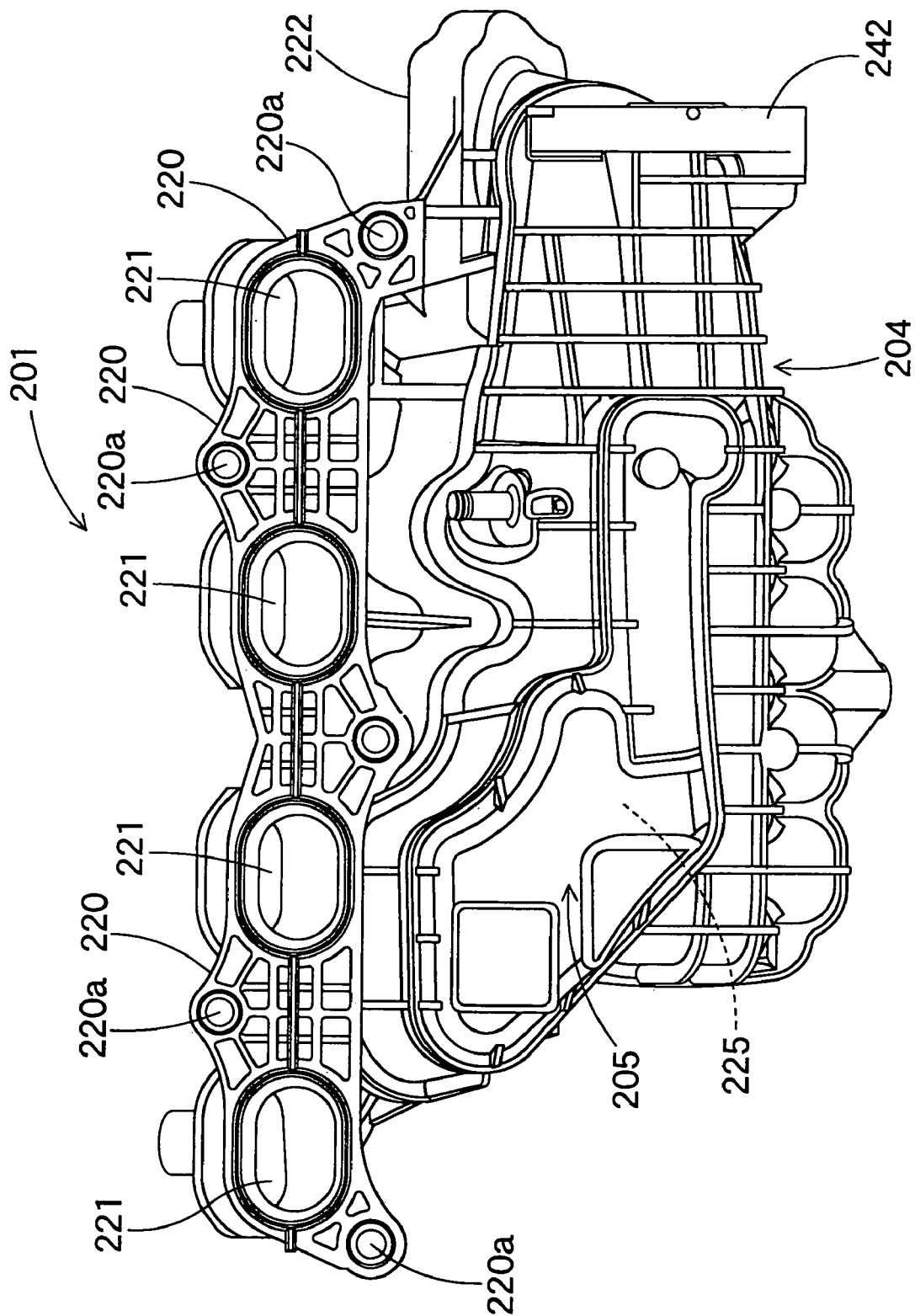
FIG. 24 is a back elevational view of the intake manifold.
Figure 25:
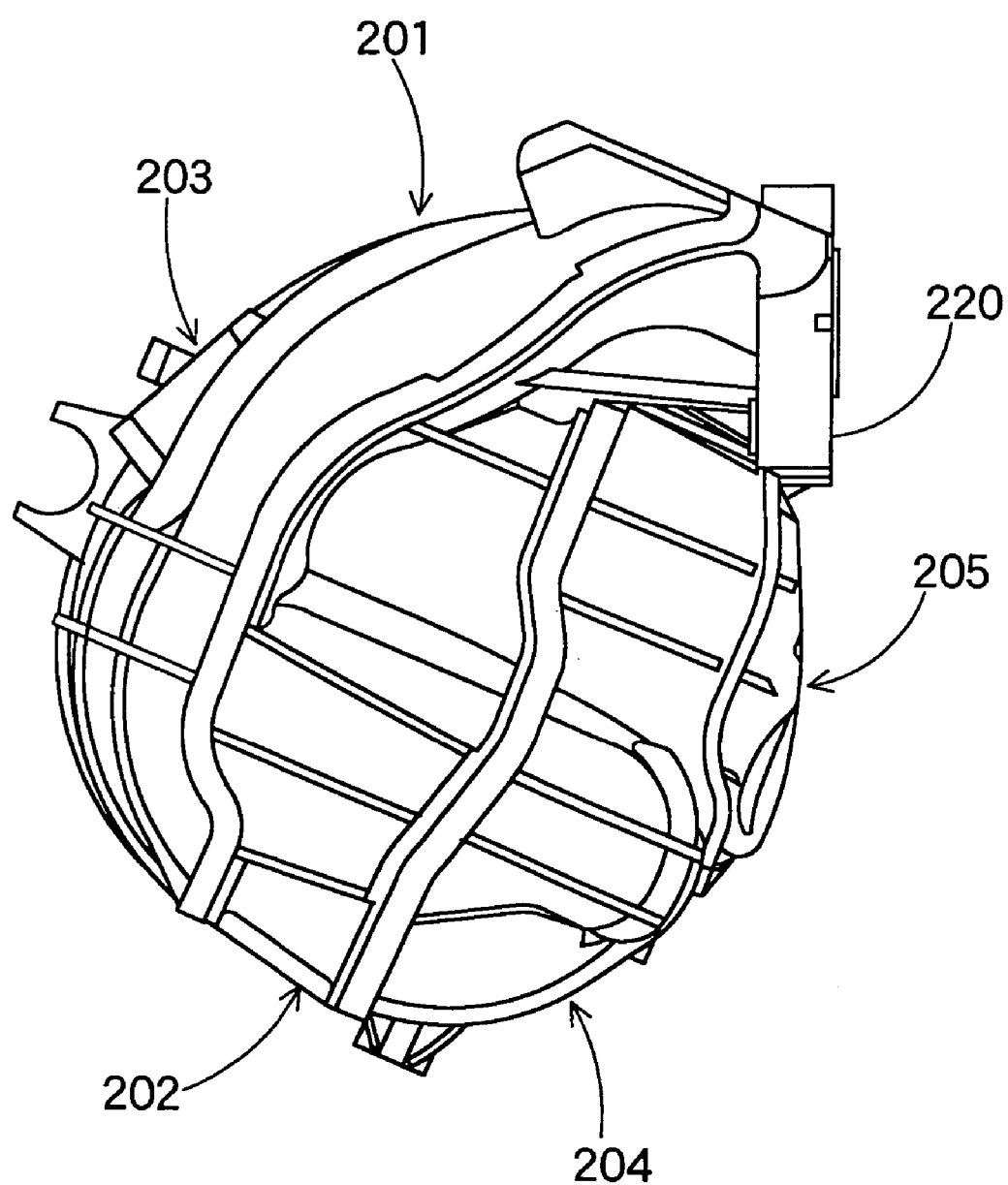
FIG. 25 is a right side elevational view of the intake manifold.
Figure 26:
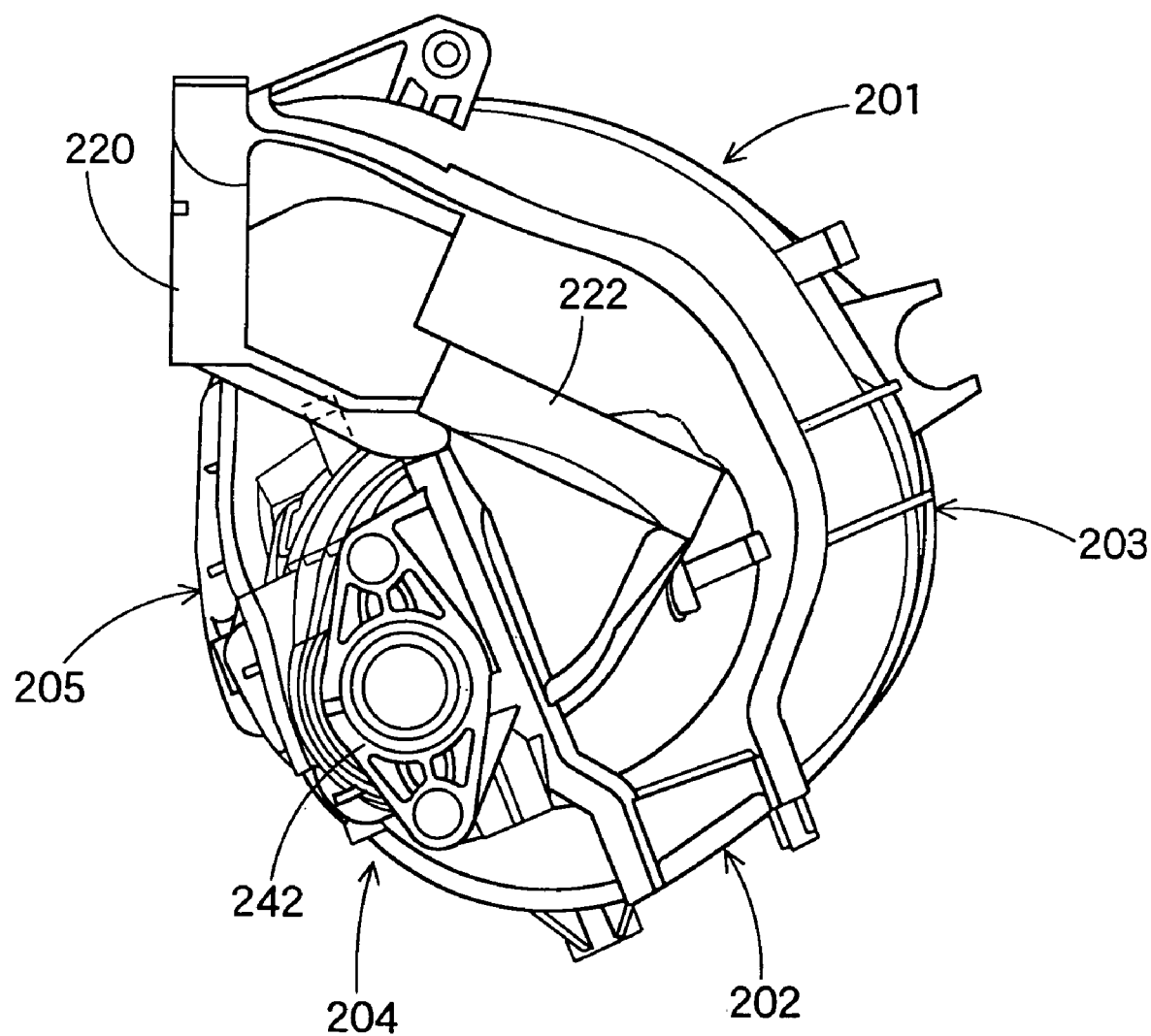
FIG. 26 is a left side elevational view of the intake manifold.

FIGS. 23 to 34 show a third embodiment in accordance with the present invention. FIG. 23 shows a front elevational view of a resin intake manifold 201 used in an in-line four-cylinder engine, FIG. 24 shows a back elevational view of the same, FIG. 25 shows a right side elevational view of same, and FIG. 26 shows a left side elevational view of the same.

The resin intake manifold 201 is constituted by a first piece 202 positioned in a center portion, a second piece 203 forming a cover portion of an independent intake passage in an upper portion, a third piece 204 positioned in a back surface portion of the first piece and forming a back surface side of a surge tank 224, and a fourth piece 205 positioned in a back surface portion of the third piece 204 and forming a cover portion of a resonator 225. Members of the first piece 202, the second piece 203, the third piece 204 and the fourth piece 205 are formed in a predetermined shape in accordance with an injection molding of synthetic resin, and are welded along a weld line ML in accordance with a vibration welding or the like, whereby the resin intake manifold 201 is formed.

Figure 27:
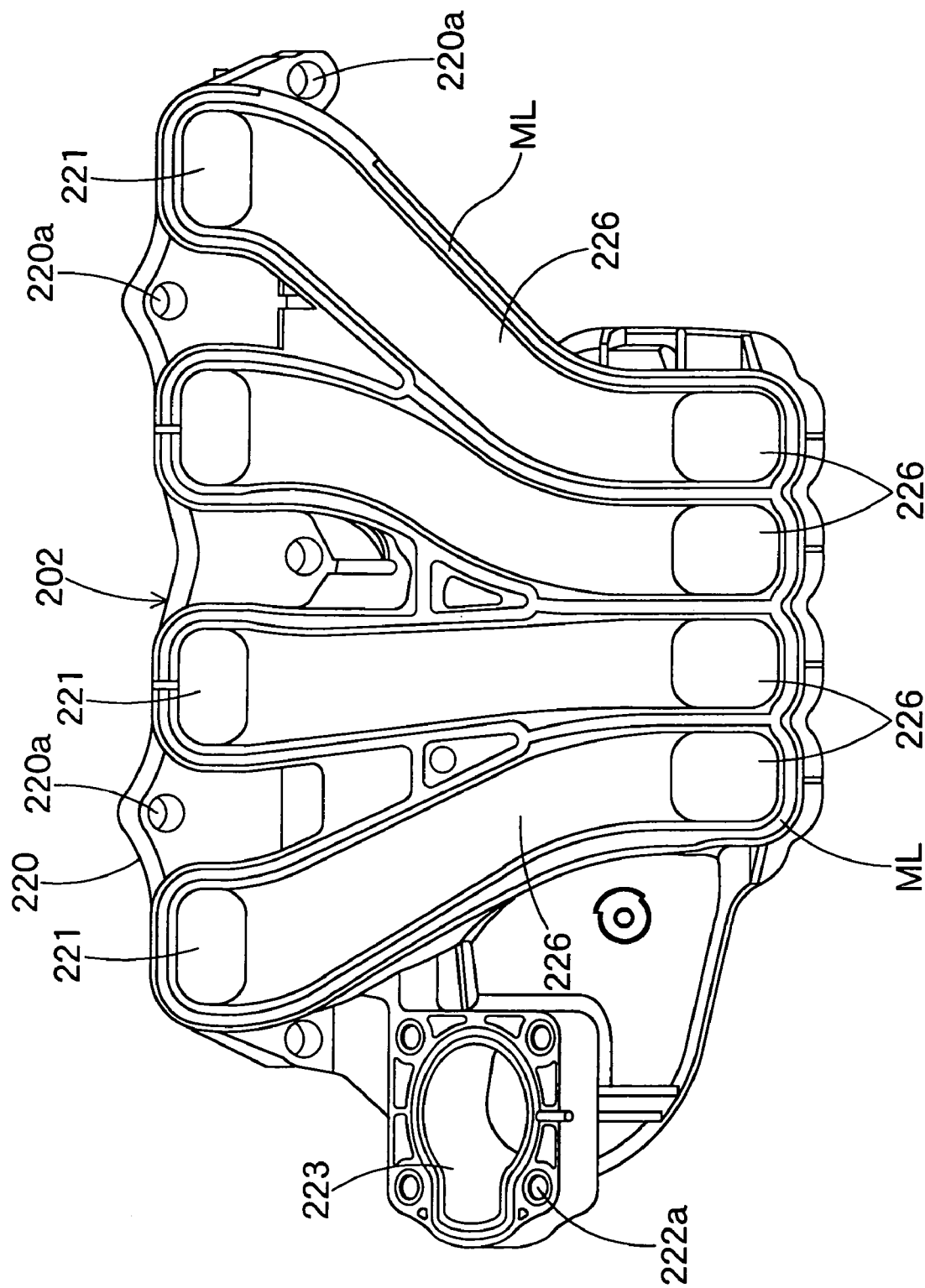
FIG. 27 is a plan view of a first piece 2 of the intake manifold.
Figure 28:
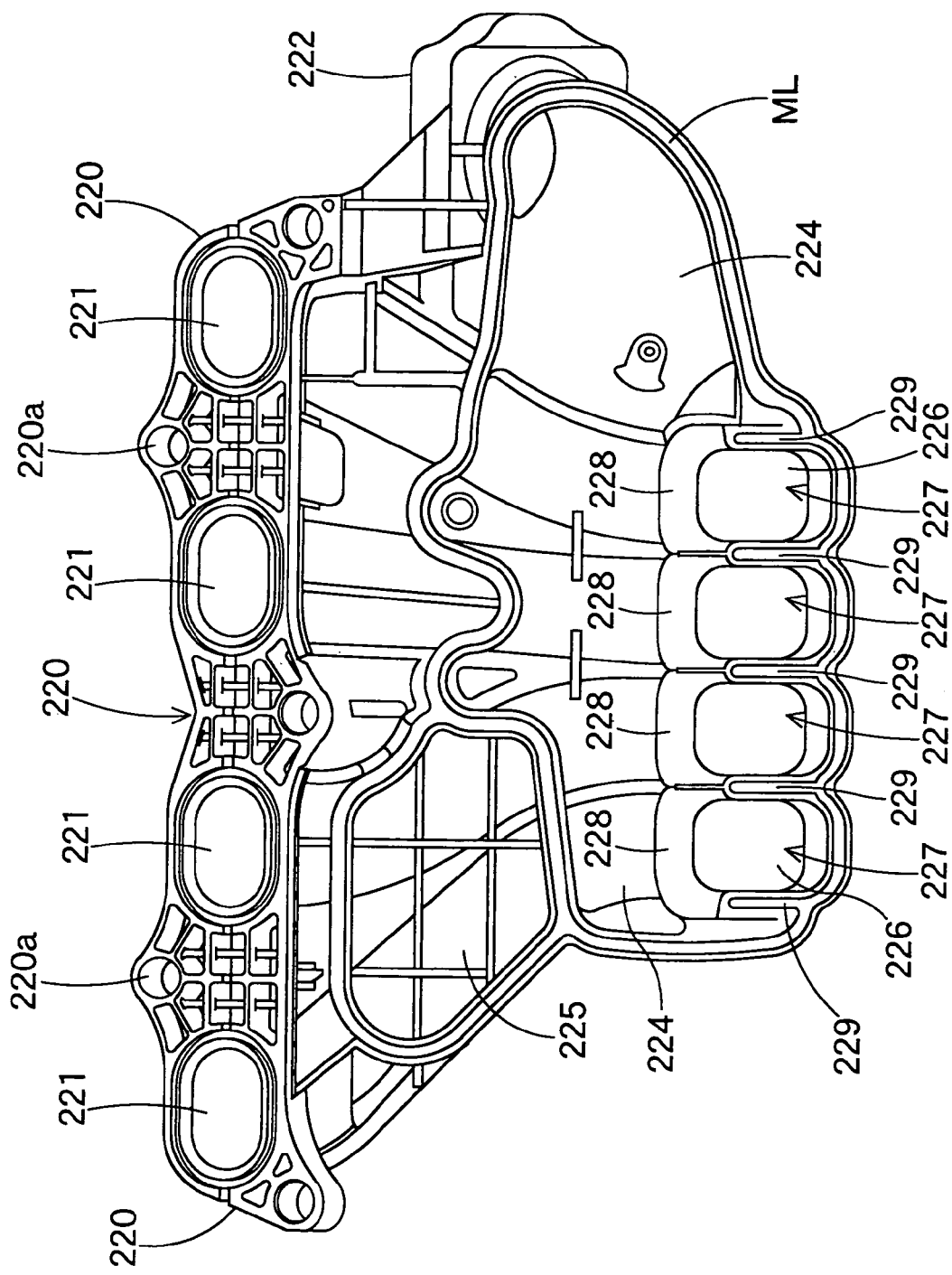
FIG. 28 is a back elevational view of the first piece 2 of the intake manifold.
Figure 29:
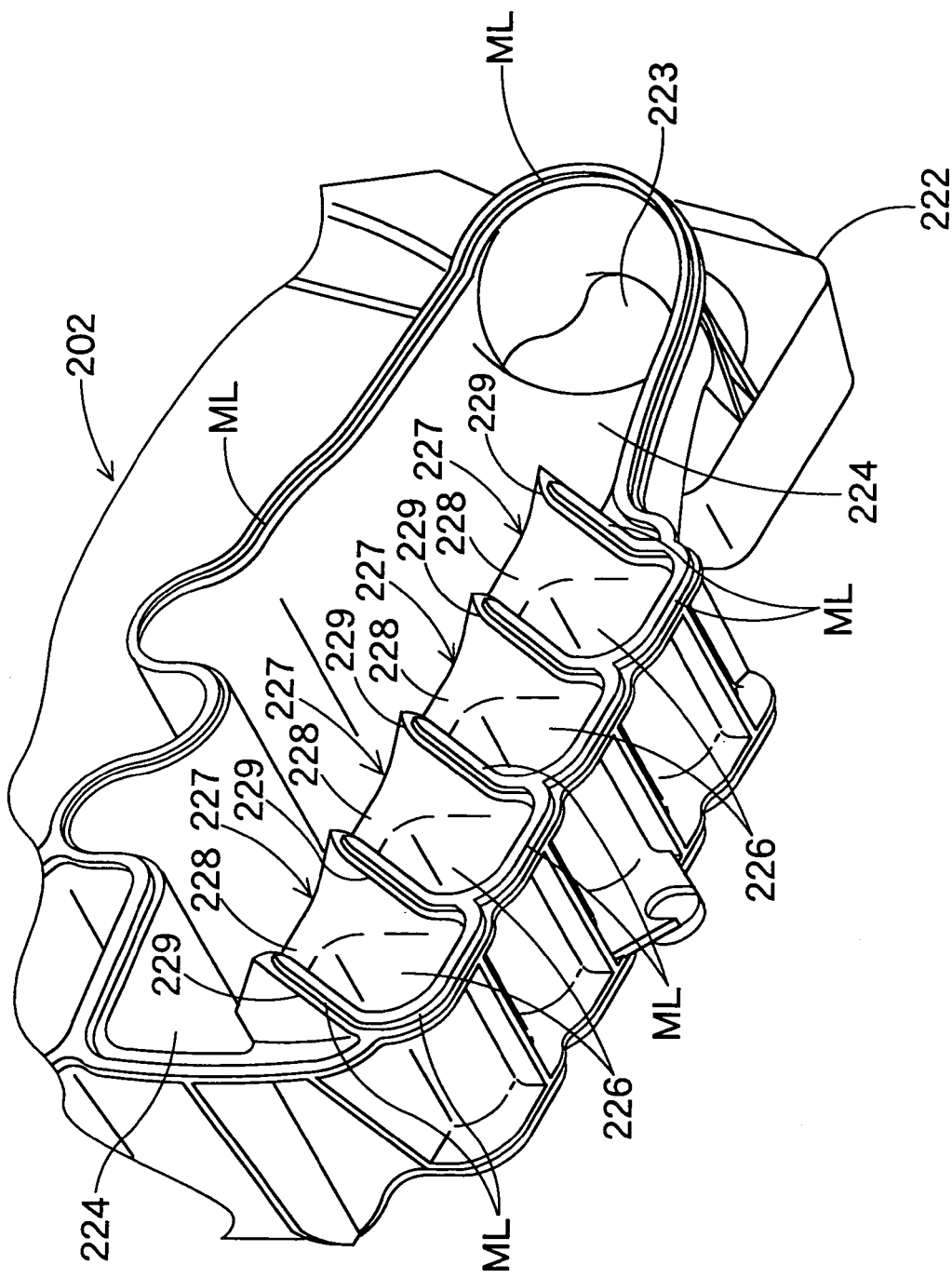
FIG. 29 is a perspective view of a funnel portion in the first piece 2 of the intake manifold.

The first piece 202 constituting a center portion of the rein intake manifold 201 has a cylinder side mounting flange 220 fixed to a cylinder side (a cylinder head side) of the engine, as shown in FIGS. 27 to 29, intake air introduction port 221 for four cylinders are provided in parallel in the cylinder side mounting flange 220, and mounting holes 220a for fixing are formed in a plurality of positions in an edge portion. Further, a portion forming a half shell portion of the surge tank 224 is formed in a back surface side of the first piece 202, and half shell portions of four independent intake passage 226 communicated with the surge tank 224 are formed in a front surface side of the first piece 202.

A throttle side mounting flange 222 for fixing a throttle valve apparatus is formed in a front surface of the first piece 202 close to a left side, as shown in FIG. 23. An intake air introduction port 223 is formed in the throttle side mounting flange 222, and mounting holes 222a are formed in a plurality of positions in an edge portion thereof. The intake air introduction port 223 is communicated with the surge tank 224 within the first piece 202.

Further, the throttle side mounting flange 222 is positioned in a side portion of the cylinder side mounting flange 220, and a plate-shaped and L-shaped connection portion is integrally formed between the throttle side mounting flange 222 and the cylinder side mounting flange 220 so as to connect the throttle side mounting flange 222 to the cylinder side mounting flange 220.

As shown in FIG. 27, a weld line ML for welding the second piece 203 forming a cover wall 231 of the upper independent intake passage 226 is formed in the front surface side of the first piece 202 along an outer shape portion of the independent intake passage 226, and as shown in FIG. 28, a weld line ML for welding the third piece 204 forming a back surface side of the surge tank 224 is formed in the back surface side of the first piece 202 along an outer shape portion of the surge tank 224.

Further, as shown in FIGS. 28 and 29, a funnel portion 227 forming an inlet is formed in a portion connected to the independent intake passage 226 from the surge tank 224, and the weld line ML is formed near the funnel portion 227. A thick funnel wall 228 is formed in an edge portion of the funnel portion 227, and a funnel partition wall 229 separating four independent intake passages 226 is formed in the funnel portion 227 so as to protrude from the first piece 202 to the third piece 204 in an approximately triangular shape, as shown in FIG. 29.

Figure 30:
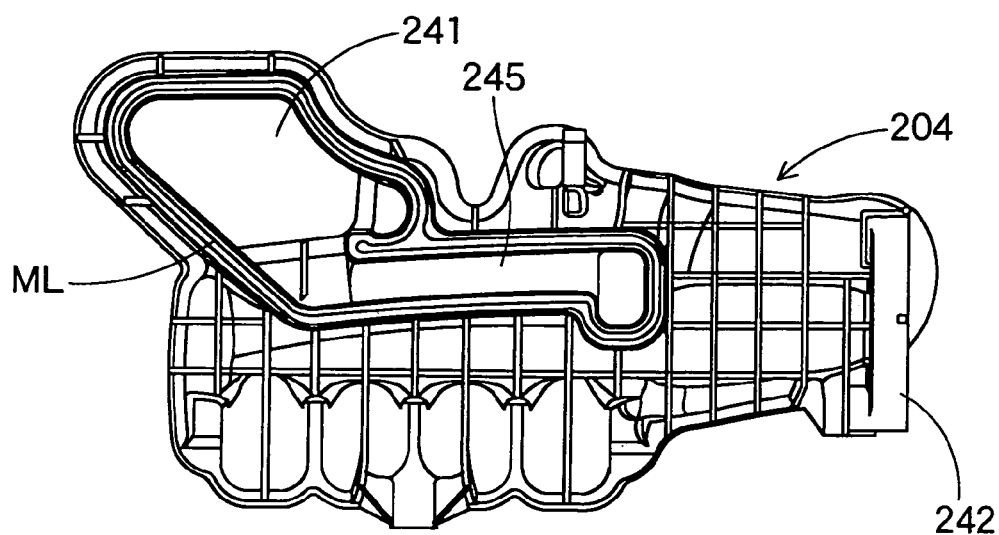
FIG. 30 is a front elevational view of a third piece 4 of the intake manifold.
Figure 31:
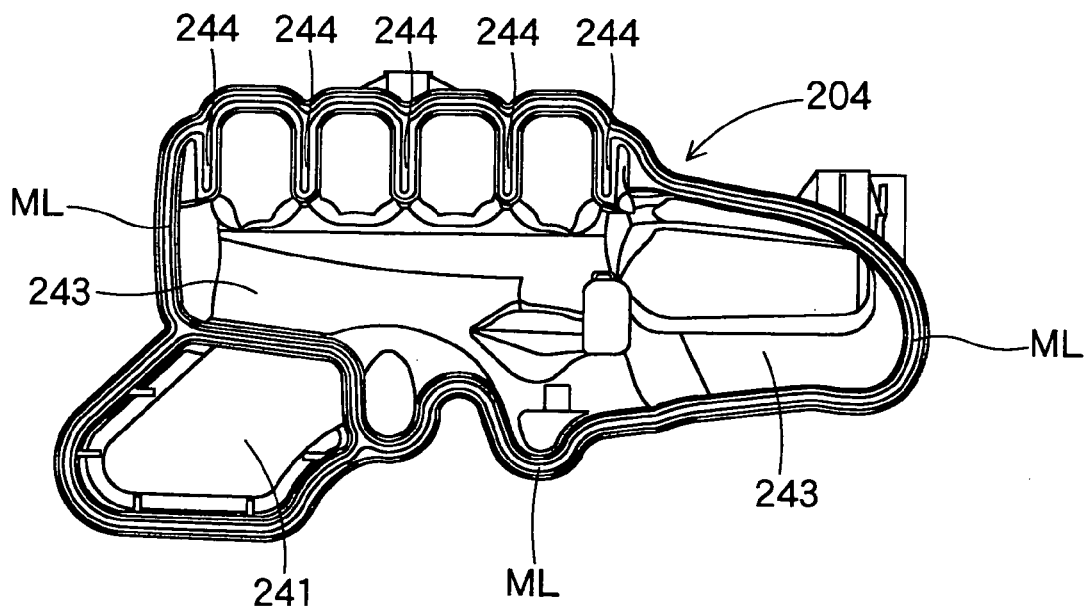
FIG. 31 is a front elevational view of the third piece 4 of the intake manifold.

The third piece 204 is formed so as to form an outer shell portion in a back surface side of the surge tank 224 in a back surface side of the first piece 202, as shown in FIGS. 30 and 31, a surge tank portion 243 forming a part of the surge tank 224 is formed in a recessed shape there, and a resonator portion 241 communicated with the surge tank portion 243 through a communication passage 245 is formed. Further, as shown in FIG. 31, a funnel wall receiving portion 244 for receiving the fitted funnel partition wall 229 is formed in the third piece 204, and a weld line ML is formed in a joint surface between the funnel partition wall 229 and the funnel wall receiving portion 244.

Further, the funnel partition wall 229 of the funnel portion 227 is formed in an approximately triangular shape in which a corner portion protrudes to the third piece 204 side, as shown in FIG. 29, and a weld line ML bent approximately in a C shape is formed in an edge portion of the funnel partition wall 229. Further, as shown in FIG. 31, the weld line ML is also formed in an edge portion of the funnel wall receiving portion 244 in the third piece 204.

Figure 32:
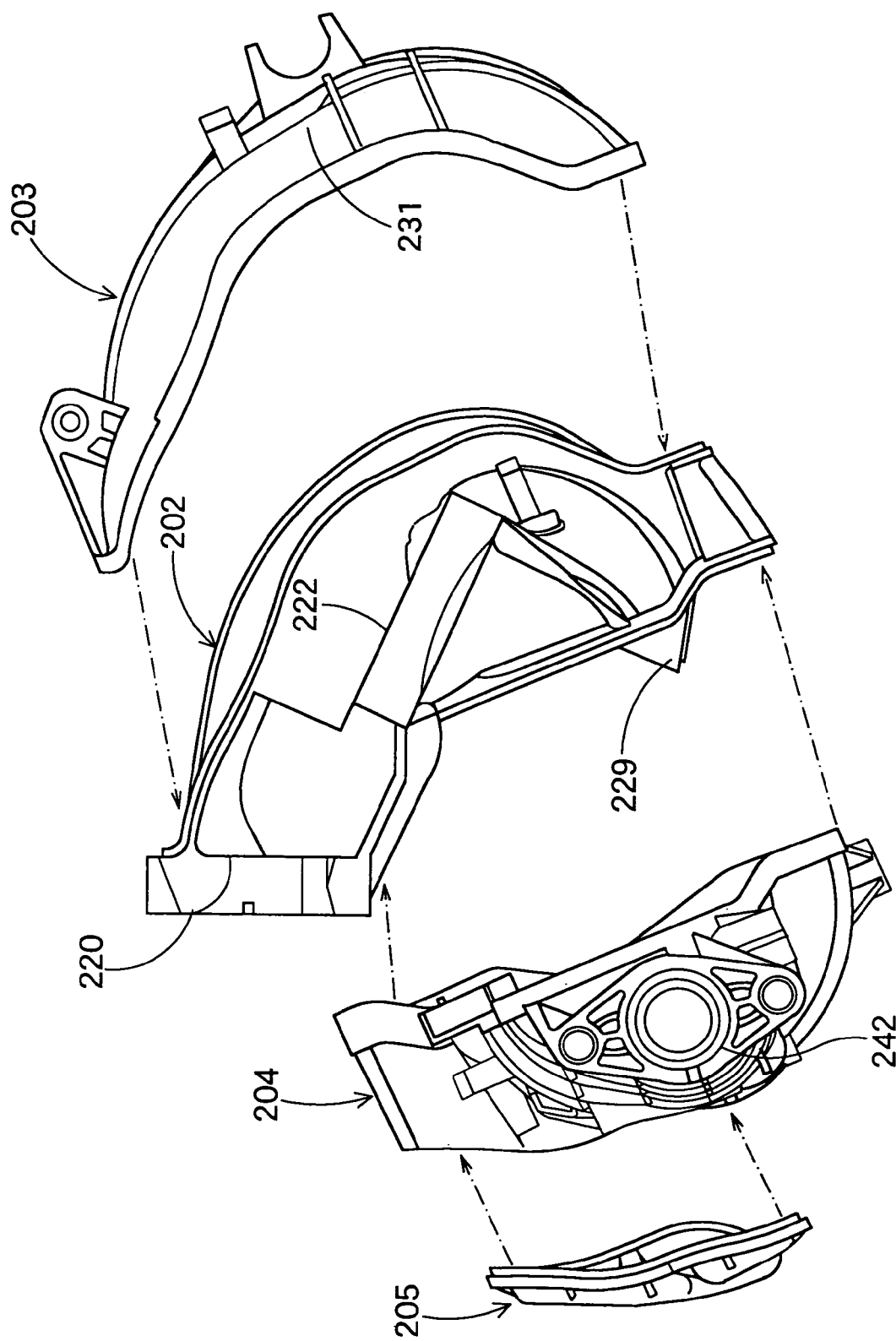
FIG. 32 is an exploded left side elevational view of the intake manifold.
Figure 33:
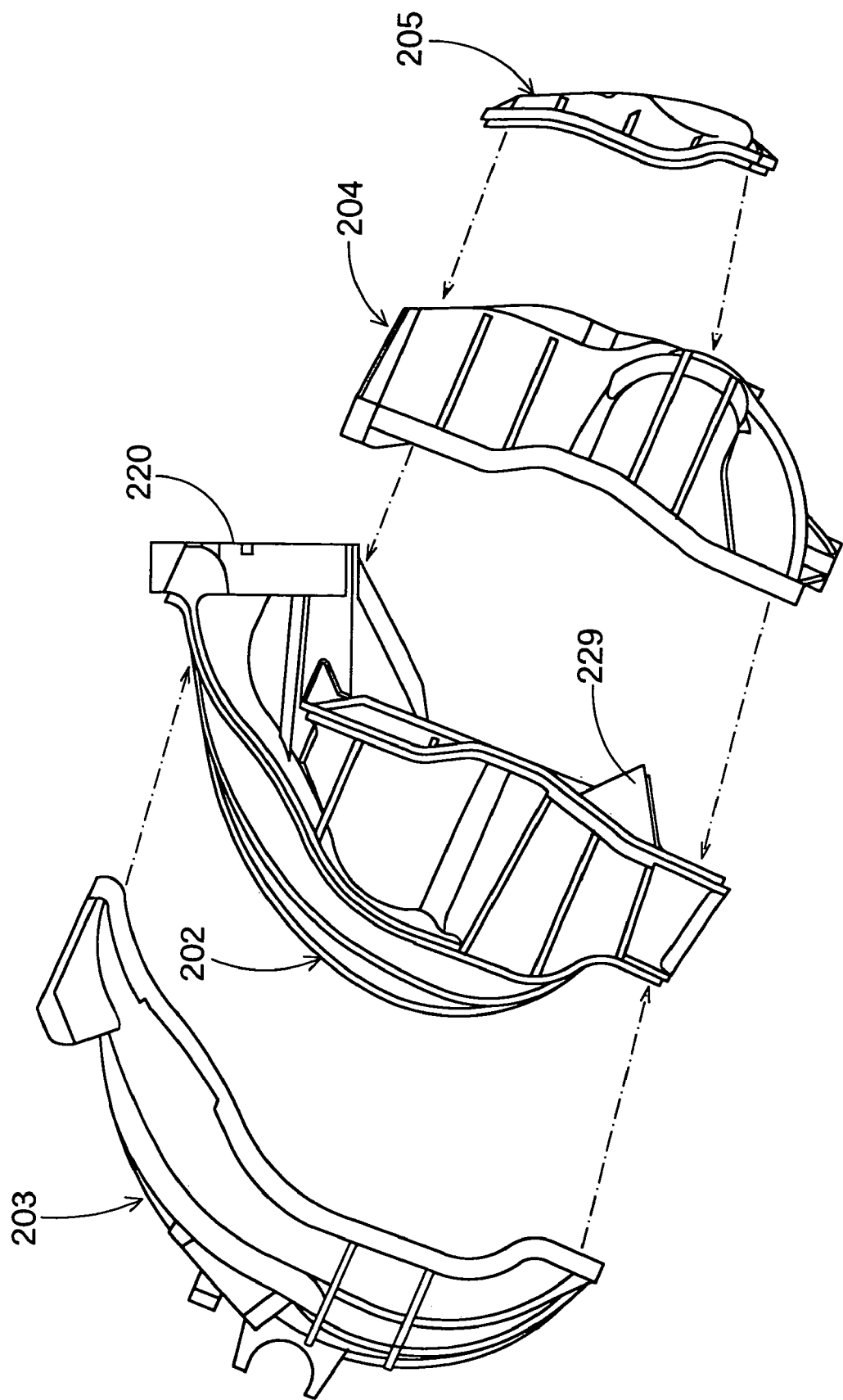
FIG. 33 is an exploded right side elevational view of the intake manifold.
Figure 34:
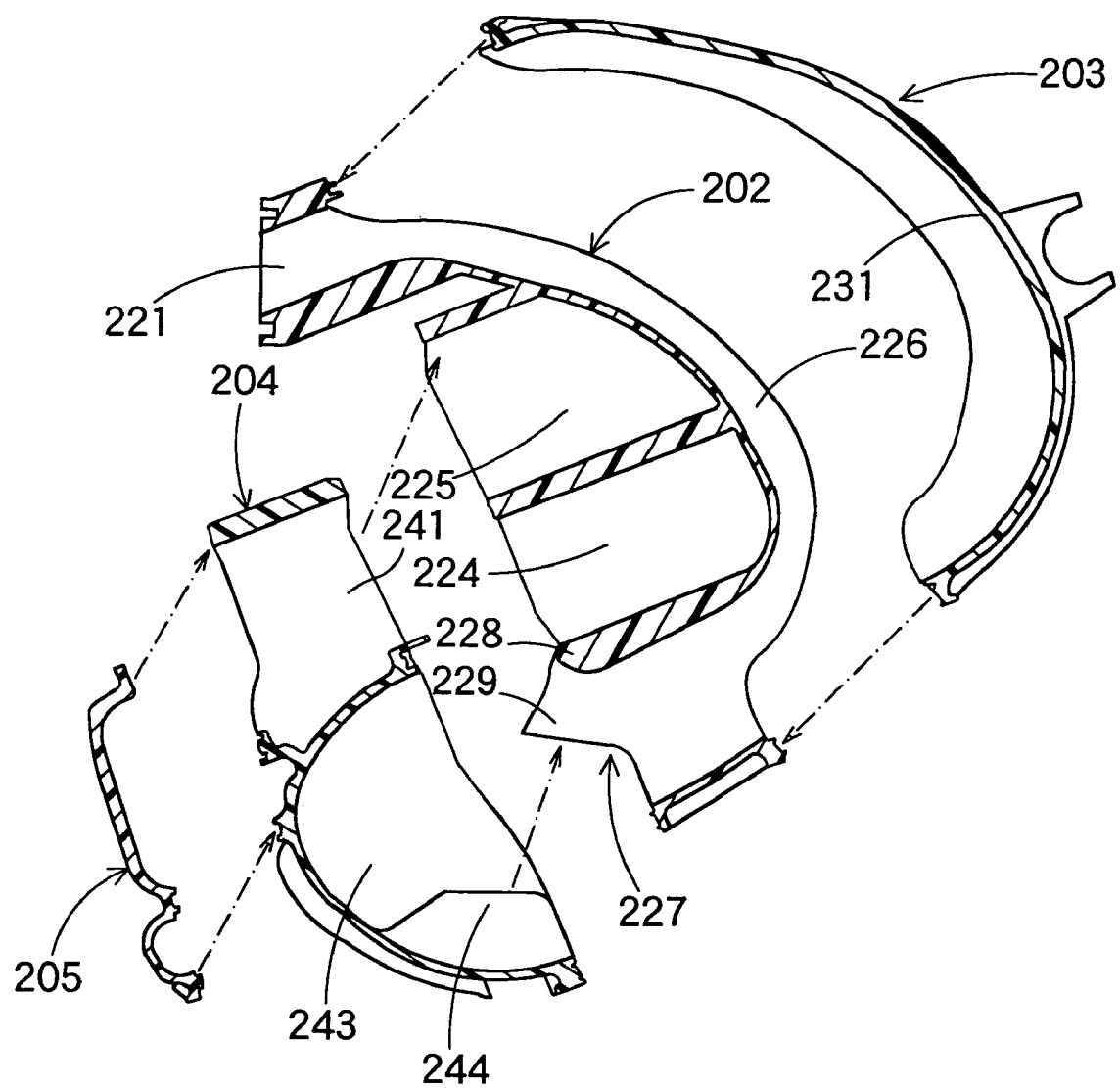
FIG. 34 is an exploded cross sectional view of the intake manifold.

On the other hand, as shown in FIGS. 32 and 33, the second piece 203 is formed in a shape forming the cover wall 231 of the independent intake passage 226 in the front side of the first piece 202, and is formed in a shape covering each of upper portions of four independent intake passages 226, and an outer edge portion is brought into contact with the weld line ML of the first piece 202 in the front side and is welded.

The forth piece 205 forming an outer shell portion of the resonator 241 is formed as a cover member in a back surface side of the resonator portion 241 in the third piece 204, and is welded to the back surface side of the third piece 204. An EGR pipe mounting flange 242 for mounting an EGR pipe is provided in a right side portion of the third piece 204.

Members of the first piece 202, the second piece 203, the third piece 204 and the fourth piece 205 having the structures mentioned above are bonded to each other as shown in FIGS. 32 to 34, a bonded portion along the weld line is welded thereto in accordance with a vibration welding, and the resin intake manifold 201 is manufactured.

The resin intake manifold 201 having the structure mentioned above is used by fixing the cylinder side mounting flange 220 to a cylinder head side of the engine (not shown), fixing a throttle valve apparatus (not shown) to the throttle side mounting flange 222, and connecting pipe arrangements such as EGR pipes or the like, sensors and the like.

At a time of operating the engine, the air sucked into the engine is filtrated by an air cleaner, thereafter passes through the throttle valve apparatus, is introduced into the resin intake manifold 1 from the intake air introduction port 223, and enters into the surge tank 224. Further, the air passes through the independent intake passage 226 connected to a downstream side of the surge tank 224, and is distributed to each of the cylinders of the engine through the intake air introduction port 221.

At a time of supplying the intake air mentioned above to each of the cylinders, a vibration is generated by a pressure pulsation generated within the resin intake manifold 1 in correspondence to the opening and closing operation of the throttle valve, and the vibration transmitted from the engine block is generated in the resin intake manifold 201.

However, particularly in the joint portion between the first piece 202 and the third piece 204 constituting the main portion, the funnel partition wall 229 of the funnel portion 227 in the first piece 202 positioned near the center portion thereof is formed in the approximately triangular shape such that the corner portion protrudes to the side of the third piece 204, and the weld line ML formed in the edge portion of the funnel partition wall 229 is welded in a three-dimensional shape.

Accordingly, even in the case that vibration of the engine or the vibration caused by the pulsation of the intake air is applied to the funnel portion or the entire of the manifold, at a time of using the intake manifold, it is possible to effectively restrict a deformation of the portion in a three-dimensional direction, and it is possible to improve a pressure resisting strength and a vibration resisting strength of the portion and the entire of the manifold.

Further, the air sucked at a time of using is distributed to each of the cylinders of the engine through the independent intake passage 226 connected to the downstream side of the surge tank 224 and through the intake air introduction port 221, however, since the step generated on the inner wall of the intake passage within the funnel portion 227 by the weld line is formed the direction approximately extending along the ventilating direction which is different from the transversal direction of the independent intake passage 226, it is possible to restrict and reduce the ventilation resistance of the intake air.

As described above, in accordance with the resin intake manifold mentioned above, the weld line formed so as to cross over the funnel portion is not formed as the flat line on the flat surface, but is formed as the three-dimensional shape. Accordingly, in the case that the intake manifold is attached to the engine and used, and the vibration caused by the vibration of the engine and the pulsation of the intake air are applied to the funnel portion, it is possible to effectively inhibit the deformation in the three-dimensional direction of the portion, and it is possible to improve the pressure resisting strength and the vibration resisting strength of the portion and the entire manifold. Further, since the step which tends to be generated in the inner wall of the intake passage within the funnel portion by the weld line is formed in the direction approximately extending along the ventilation direction which is different from the transversal direction of the intake passage, it is possible to reduce the ventilation resistance of the intake air.

What is claimed is:

1. A resin intake manifold comprising: at least two separated bodies in which protrusions of weld portions are connected to each other in accordance with a vibration welding; and a cover wall in which one of said weld portions is arranged in an inner side or an outer side of said protrusion with leaving space with said protrusion, wherein said protrusions of the weld portions are respectively provided with parallel protrusion portions extending in parallel to a vibrating direction of the vibration welding, wherein a cover wall arranged at a position in an orthogonal direction to the vibrating direction in said parallel protrusion portions is provided with an extension portion extending to the separated body in the other side welded to the separated body provided with said cover wall, in such a manner as to prevent a burr generated at a time of welding said parallel protrusion portion from getting over said cover wall arranged at the position in the orthogonal to said vibrating direction in said parallel protrusion portion, and wherein a recess groove receiving said extension portion is arranged in a side of said other side separated body, wherein each parallel protrusion portion terminates at a leading end thereof and the extension portion is disposed apart from and extends parallel to one of the parallel protrusion portions with the extension protrusion terminating beyond the leading end of the one parallel protrusion portion.

2. A resin intake manifold as claimed in claim 1, wherein the resin intake manifold is provided with a plurality of distribution passages capable of flowing an intake fluid so as to integrally put base portion sides together and separate leading end portion sides into a plurality of sections, wherein said two separated bodies are constituted by a cover member forming an outer wall of each of said distribution passages, and a base member welded to said cover member and forming each of said distribution passages together with said cover member, wherein said cover member is provided with an assembled portion integrally covering the base portion sides of said respective distribution passages, and branch portions arranged so as to extend from said assembled portion to the leading end portion sides of said respective distribution passages and separated from each other in correspondence to the number of said respective distribution passages, and wherein the vibrating direction at a time of vibration welding is set to a direction extending along the parallel arranging direction of said respective distribution passages, and said parallel protrusion portion and the cover wall provided with said extension portion are arranged at a leading end of each of said branch portions in the cover member.

3. A resin intake manifold as claimed in claim 1, wherein the cover wall provided with said extension portion is arranged in the side of each of said distribution passages in said parallel protrusion portion.

* * * * *